(12) United States Patent  
Georgiadis et al.

(10) Patent No.: US 11,887,089 B2  
(45) Date of Patent: Jan. 30, 2024

(54) DYNAMIC AND PREDICTIVE ADJUSTMENT OF PAYMENT ATTRIBUTES BASED ON CONTEXTUAL DATA AND METADATA

(71) Applicant: Zact Inc., Saratoga, CA (US)

(72) Inventors: Ioannis Georgiadis, Voula (GR); Gopalakrishnan Hariharan, Highlands Ranch, CO (US); John K. Thomas, Saratoga, CA (US)

(73) Assignee: Zact, Inc., Saratoga, CA (US)

( * ) Notice: Subject to any disclaimer, the term of this patent is extended or adjusted under 35 U.S.C. 154(b) by 104 days.

(21) Appl. No.: 17/488,136

(22) Filed: Sep. 28, 2021

(65) Prior Publication Data

US 2022/0101288 A1 Mar. 31, 2022

Related U.S. Application Data

(60) Provisional application No. 63/152,353, filed on Feb. 23, 2021, provisional application No. 63/084,565, filed on Sep. 29, 2020.

(30) Foreign Application Priority Data

Jul. 1, 2021 (GR) .............................. 20210100451

(51) Int. Cl.
*G06Q 20/12* (2012.01)
*G06Q 20/32* (2012.01)
(Continued)

(52) U.S. Cl.
CPC ....... *G06Q 20/127* (2013.01); *G06Q 20/3224* (2013.01); *G06Q 20/3267* (2020.05); *G06Q 20/4015* (2020.05); *G06Q 50/30* (2013.01)

(58) Field of Classification Search
CPC ............. G06Q 20/127; G06Q 20/3224; G06Q 20/3267; G06Q 20/4015; G06Q 50/30;
(Continued)

(56) References Cited

U.S. PATENT DOCUMENTS 7,650,300 B2 1/2010 Darvish et al.
8,770,480 B2 7/2014 Gulli
(Continued)

FOREIGN PATENT DOCUMENTS

GB 2449476 A 11/2008
WO WO2007135661 A1 11/2007
WO WO2016108165 A1 7/2016

OTHER PUBLICATIONS

USPTO, International Search Report for International Patent Application No. PCT/US21/52573, dated Dec. 28, 2021, 2 pages.
(Continued)

*Primary Examiner* — Clifford B Madamba
(74) *Attorney, Agent, or Firm* — Yantra Patents LLC; Anand P Narayan

(57) ABSTRACT

Implementations described herein relate to dynamic and predictive updating of a payment attribute of a payment instrument. In some implementations, the method includes receiving, at a computing device, route data for a plurality of trips, receiving, at the computing device, first trip data for the first trip from the user device, wherein the first trip data includes at least location data of the user device, calculating, based on the received first trip data, a fuel likelihood score for the first trip, comparing the fuel likelihood score to a first threshold, based on a determination that the fuel likelihood score meets the first threshold: transmitting, to a computer associated with a payment network, a message to update one or more payment attributes stored at the payment network and associated with the first payment instrument, and displaying an indication that the first payment instrument is approved for the fuel transaction.

20 Claims, 17 Drawing Sheets

(51) Int. Cl.
*G06Q 20/38* (2012.01)
*G06Q 20/40* (2012.01)
*G06Q 50/30* (2012.01)

(58) Field of Classification Search
CPC ............. G06Q 20/085; G06Q 20/3265; G06Q 20/389; G06Q 20/405; G06Q 20/409
USPC .......................................................... 705/40
See application file for complete search history.

(56) References Cited

U.S. PATENT DOCUMENTS

| | | | | |
|---|---|---|---|---|
| 9,672,497 | B1* | 6/2017 | Lewis | ................... G06F 40/284 |
| 10,627,831 | B2 | 4/2020 | Hayes et al. | |
| 2009/0289113 | A1* | 11/2009 | Vilnai | ..................... G06Q 30/06 |
| | | | | 705/41 |
| 2010/0191674 | A1* | 7/2010 | Condon | ................. G06Q 50/06 |
| | | | | 705/413 |
| 2010/0332363 | A1 | 12/2010 | Duddle et al. | |
| 2012/0095920 | A1 | 4/2012 | McQuade et al. | |
| 2012/0290459 | A1 | 11/2012 | Kirch et al. | |
| 2013/0226371 | A1 | 8/2013 | Rovik et al. | |
| 2014/0195044 | A1* | 7/2014 | McQuade | .............. G06Q 10/06 |
| | | | | 700/237 |
| 2014/0309863 | A1 | 10/2014 | Ricci | |
| 2015/0019266 | A1 | 1/2015 | Stempora | |
| 2015/0088613 | A1 | 3/2015 | Pierce, Jr. et al. | |
| 2016/0035153 | A1* | 2/2016 | Lesesky | ................. G07C 5/085 |
| | | | | 701/115 |
| 2016/0102993 | A1 | 4/2016 | Nortrup | |
| 2019/0251365 | A1 | 8/2019 | Salman | |

OTHER PUBLICATIONS

USPTO, Written Opinion of the International Searching Authority for International Patent Application No. PCT/US21/52573, dated Dec. 28, 2021, 7 pages.

* cited by examiner

DYNAMIC AND PREDICTIVE ADJUSTMENT OF PAYMENT ATTRIBUTES BASED ON CONTEXTUAL DATA AND METADATA

CROSS-REFERENCE TO RELATED APPLICATIONS

This application claims priority to U.S. Provisional Patent Application No. 63/084,565, filed 29 Sep. 2020, titled "MACHINE LEARNING & RISK BASED AUTOMATON FOR FLEET, FUEL, FUNDING, & CAR CONTROLS," to U.S. Provisional Patent Application No. 63/152,353, filed 23 Feb. 2021, titled "FLEET CARD AUTHORIZATION UNDER CONDITIONS OF LIMITED CONNECTIVITY," and to Greek Patent Application No. 20210100451, filed Jul. 1, 2021, titled "HIGH AVAILABILITY REAL-TIME AUTHORIZATION OF TRANSACTIONS." All of the above applications are incorporated by reference herein in their entirety.

TECHNICAL FIELD

Embodiments relate generally to predicted adjustment of payment attributes based on contextual data, and specifically, to the dynamic and predictive adjustment of payment attributes for fuel related transactions.

BACKGROUND

Payment instruments are commonly utilized by businesses for covering costs incurred by their employees. For example, in a typical fleet operation, drivers are provided with credit cards to make payments for fuel and other miscellaneous expenses that are incurred during a trip.

However, employees may misuse the payment instruments and utilize them for personal expenses. Such misuse may be difficult to detect using conventional technologies and techniques.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method to update a payment attribute of a payment instrument associated with a vehicle of a fleet that includes a plurality of vehicles. The method also includes receiving, at a computing device, route data for a plurality of trips, where the route data for each trip of the plurality of trips includes a corresponding geofence region, a corresponding user identifier, a corresponding payment instrument identifier, and a corresponding vehicle identifier for each trip; receiving, from a user device, a transmission of one or more data packets generated at a software application executing on the user device, where the one or more data packets may include a user identifier and a vehicle identifier; authenticating, by the computing device, the vehicle identifier and the user identifier; identifying a first trip of the plurality of trips based on a match of the user identifier and the vehicle identifier with the route data, where the first trip is associated with a first payment instrument; receiving, at the computing device, first trip data for the first trip from the user device, where the first trip data includes at least location data of the user device; calculating, based on the received first trip data, a fuel likelihood score for the first trip, where the fuel likelihood score is indicative of a degree of validity of a fuel transaction; comparing the fuel likelihood score to a first threshold; based on a determination that the fuel likelihood score meets the first threshold: transmitting, to a computer associated with a payment network, a message to update one or more payment attributes stored at the payment network and associated with the first payment instrument; and displaying or causing a display, on the application executing on the user device, an indication that the first payment instrument is approved for the fuel transaction. The method also includes based on a determination that the fuel likelihood score does not meet the first threshold and meets a second threshold: displaying or causing a display, on the application executing on the user device, a request for additional verification data. The method also includes receiving, from the user device, the additional verification data; calculating, based on the additional verification data and the received first trip data, an updated fuel likelihood score for the first trip; comparing the updated fuel likelihood score to the first threshold. The method also includes based on a determination that the updated fuel likelihood score meets the first threshold: transmitting to a computer associated with a payment network, a message to update one or more payment attributes stored at the payment network and associated with the first payment instrument; and displaying or causing a display, on the application executing on the user device, an indication that the first payment instrument is approved for the fuel transaction. Other embodiments of this aspect include corresponding computer systems, apparatus, and computer programs recorded on one or more computer storage devices, each configured to perform the actions of the methods.

Implementations may include one or more of the following features. The method may include: receiving at two or more groups of authorization control pods, an authorization request from the payment network for a fuel transaction, where the authorization request includes an identifier associated with the first payment instrument and transaction information about the transaction, and where each authorization control pod includes a processing service, a database service, and a policy agent; analyzing, at a corresponding policy agent of a single authorization control pod of the groups of authorization control pods, the transaction information by comparing one or more transaction attributes in the transaction information combined with contextual and historic data against one or more policies stored in the database service; and based on the comparison, transmitting one of an approval or a rejection of the transaction to the payment network. Calculating the fuel likelihood score for the first trip may include providing the first trip data to a trained machine learning model. The fuel likelihood score is calculated based on the first trip data and the received telemetric data; and storing, at the computing device, the first trip data and the received telemetric data in a linked data structure. Receiving the first trip data may include receiving a plurality of packets transmitted from the software application at a first periodicity that is based on one or more of: a time elapsed since an estimated time of commencement of the trip and a distance elapsed since the commencement of the trip. Implementations of the described techniques may include hardware, a method or process, or computer software on a computer-accessible medium.

One general aspect includes a method to update a payment attribute of a payment instrument. The method also includes receiving, by a computing device may include a processor and memory, an indication of a trip being undertaken by a vehicle; associating with the trip, by the computing device, a user device, a user identifier, and a vehicle identifier; receiving, by the computer device, from an application executing on a user device of a user of the vehicle, trip data that includes at least location data obtained from the user device; calculating, based on the received trip data, a fuel likelihood score for the trip, where the fuel likelihood score is indicative of a degree of validity of a fuel transaction; comparing the fuel likelihood score to a first threshold; and based on a determination that the fuel likelihood score meets the first threshold: transmitting, to a computer associated with a payment network, a message to update one or more payment attributes that are stored in a device of the payment network and where the one or more payment attributes are associated with a payment instrument; and displaying, on the application executing on the user device, an indication that the payment instrument is approved for the fuel transaction. Other embodiments of this aspect include corresponding computer systems, apparatus, and computer programs recorded on one or more computer storage devices, each configured to perform the actions of the methods.

Implementations may include one or more of the following features. The method may include based on a determination that the fuel likelihood score does not meet the first threshold and meets a second threshold: displaying or causing a display, on the application executing on the user device, a request for additional verification data; receiving, from the user device, the additional verification data; calculating, based on the additional verification data and the received trip data, an updated fuel likelihood score for the trip; comparing the updated fuel likelihood score to the first threshold; and based on a determination that the fuel likelihood score meets the first threshold: transmitting, to a computer associated with a payment network, a message to update one or more payment attributes that are stored in a device of the payment network and where the one or more payment attributes are associated with the payment instrument; and displaying or causing a display, on the application executing on the user device, an indication that the payment instrument is approved for the fuel transaction. Displaying or causing a display of the request for additional verification data may include displaying or causing the display of a request for an image of one or more of: an odometer, a dashboard, or a license plate of the vehicle, and where receiving the additional verification data may include receiving image data and corresponding image metadata. Calculating the fuel likelihood score may include analyzing the received image data and the received image metadata to determine one or more of an odometer mileage and an estimated fuel level. Analyzing the received image data and the received image metadata may include determining a distance traveled since a previous fueling event. The telemetric data may include two or more of: location data, fuel level data, and fuel efficiency data. Calculating the fuel likelihood score may include applying a trained machine learning (ml) model to the trip data. The authorization request includes an identifier associated with the payment instrument and transaction information about the transaction, and where each authorization control pod includes a processing service, a database service, and a policy agent; analyzing, at a corresponding policy agent of a single authorization control pod of the groups of authorization control pods, the transaction information by comparing one or more transaction attributes in the transaction information combined with contextual and historic data against one or more policies stored in the database service; and based on the comparison, transmitting one of an approval or a rejection of the transaction to the payment network. The transaction attributes in the transaction information received from the payment network includes a pump location identifier, and where analyzing the transaction information may include comparing the pump location identifier to the location data received from the user device. Receiving the trip data may include receiving a plurality of packets transmitted from the application at a first periodicity that is based on one or more of: a time elapsed since an estimated time of commencement of the trip and a distance elapsed since the commencement of the trip. Implementations of the described techniques may include hardware, a method or process, or computer software on a computer-accessible medium.

One general aspect includes a non-transitory computer-readable medium may include instructions that includes receiving, by a computing device may include a processor and memory, an indication of a trip being undertaken by a vehicle; associating with the trip, by the computing device, a user device, a user identifier, and a vehicle identifier; receiving, by the computer device, from an application executing on a user device of a user of the vehicle, trip data that includes at least location data obtained from the user device; calculating, based on the received trip data, a fuel likelihood score for the first trip, where the fuel likelihood score is indicative of a degree of validity of a fuel transaction; comparing the fuel likelihood score to a first threshold; and based on a determination that the fuel likelihood score meets the first threshold: transmitting, to a computer associated with a payment network, a message to update one or more payment attributes that are stored in a device of the payment network and where the one or more payment attributes are associated with a payment instrument; and displaying, on the application executing on the user device, an indication that the payment instrument is approved for the fuel transaction. Other embodiments of this aspect include corresponding computer systems, apparatus, and computer programs recorded on one or more computer storage devices, each configured to perform the actions of the methods.

Implementations may include one or more of the following features. The non-transitory computer-readable medium where the operations further may include: based on a determination that the fuel likelihood score does not meet the first threshold and meets a second threshold: displaying or causing a display, on the application executing on the user device, a request for additional verification data; receiving, from the user device, the additional verification data; calculating, based on the additional verification data and the received trip data, an updated fuel likelihood score for the trip; comparing the updated fuel likelihood score to the first threshold; and based on a determination that the fuel likelihood score meets the first threshold: transmitting, to a computer associated with a payment network, a message to update one or more payment attributes that are stored in a device of the payment network and where the one or more payment attributes are associated with the payment instrument; and displaying or causing a display, on the application executing on the user device, an indication that the payment instrument is approved for the fuel transaction. Displaying or causing a display of the request for additional verification data may include displaying or causing the display of a request for an image of one or more of: an odometer, a dashboard, or a license plate of the vehicle, and where receiving the additional verification data may include receiving image data and corresponding image metadata. The operations further may include: receiving at two or more groups of authorization control pods, an authorization request from the payment network for the fuel transaction, where the authorization request includes an identifier associated with the payment instrument and transaction information about the transaction, and where each authorization control pod includes a processing service, a database service, and a policy agent; analyzing, at a corresponding policy agent of a single authorization control pod of the groups of authorization control pods, the transaction information by comparing one or more transaction attributes in the transaction information combined with contextual and historic data against one or more policies stored in the database service; and based on the comparison, transmitting one of an approval or a rejection of the transaction to the payment network. Implementations of the described techniques may include hardware, a method or process, or computer software on a computer-accessible medium.

DETAILED DESCRIPTION

Figure 1:
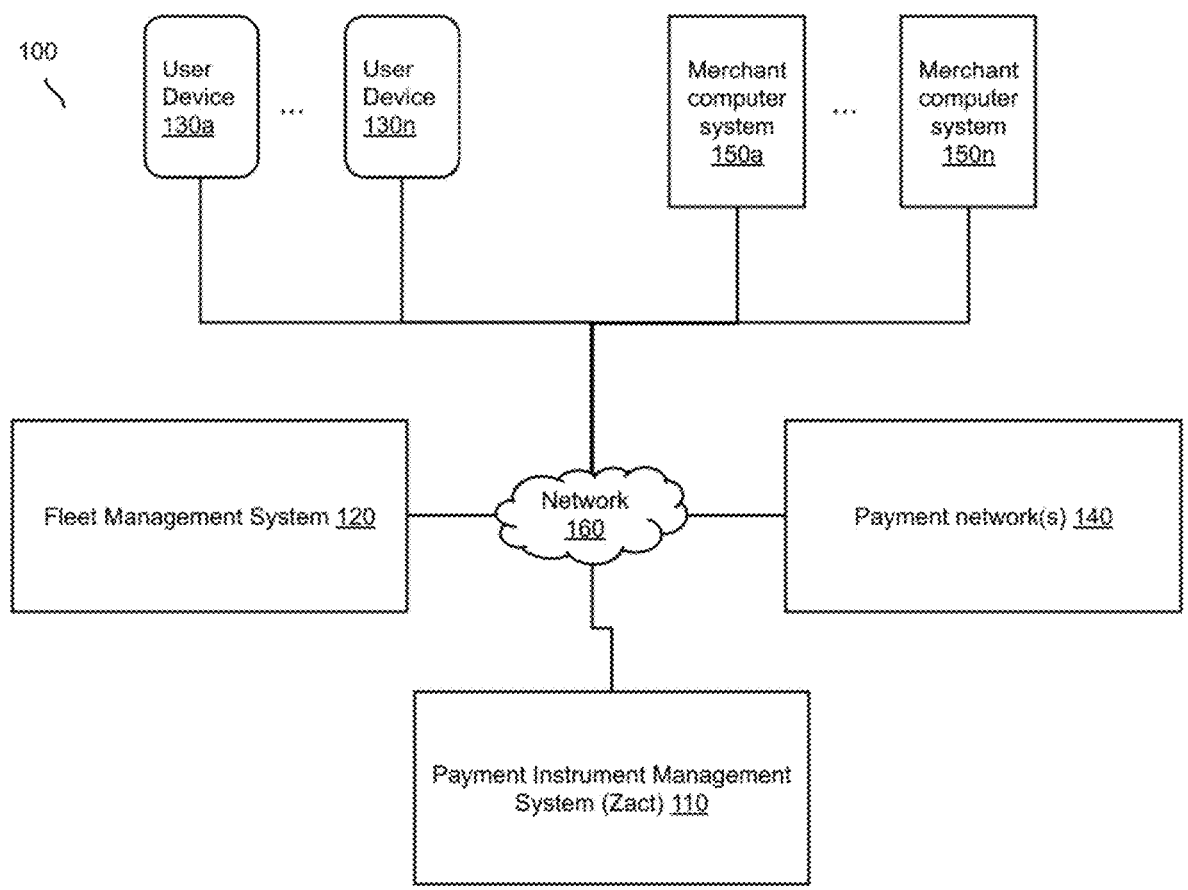
FIG. 1 is a diagram of an example system environment for dynamic and predictive adjustment of payment attributes based on contextual data and metadata, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc., indicate that the embodiment described may include a particular feature, structure, or characteristic, but every embodiment may not necessarily include the particular feature, structure, or characteristic. Similarly, references in the specification to "some implementations", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same embodiment or implementation. Further, when a particular feature, structure, or characteristic is described in connection with an embodiment, such feature, structure, or characteristic may be implemented in connection with other embodiments whether or not explicitly described.

Businesses commonly provide payment instruments to their employees for use with purchases. The payment instruments can include credit cards, digital wallets, tokens, etc. Fraud and misuse of the credit cards is common and can lead to unnecessary expenditure.

Monitoring usage of the payment instruments such as credit cards poses challenges, particularly when the expenditures are remotely incurred. For example, businesses that maintain fleets of vehicles, e.g., service providers of services such as plumbing, electrical services, moving companies, trucking operators, etc., typically incur expenses that are incurred away from a central place of operation. For example, fueling costs, meal costs while on travel, etc. can be difficult to monitor.

Techniques of this disclosure can be applied to payment instruments such that a specific context of a user can be monitored, and expenses can be dynamically approved (authorized) based on the detected user context. In some implementations, the payment instruments may be configured such that they are unusable at a merchant or other location by default, and usable only based on a signal or message transmitted to a payment network that adjusts one or more payment related attributes. The techniques may be applied to open payment network systems with minimal changes to elements in the payment infrastructure, e.g., a card processing workflow, merchant processing workflow, etc. This may be provided advantageous over closed payment network systems where the payment instrument is only valid for use at selected merchant establishments.

Adjustment of payment attributes may be utilized to implement smart spending controls by only enabling transactions in categories that are pre-approved, e.g., by an employer. For example, dynamic adjustment of payment attributes may be utilized to only permit transactions in particular merchant category codes (MCC), or only for selected merchants. Additionally, spending limits may also be placed for different categories of transactions.

In some implementations, an authorization (auth) threshold may be specified, which may continuously be updated such that they are pre-calculated before an actual authorization request arrives in a Balance Enquiry workflow. This may enable the workflow to be successfully performed within an allocated time budget, whereas the allocated time budget may not be sufficient for a computation of an authorization threshold in real-time (or substantially in real-time).

Adjustment of payment attributes may be utilized in a variety of payment systems. For example, some payment systems may be configured such that when a request for authorization for a transaction is received from a merchant at a payment network, e.g., a card processor, the request and details of the proposed transaction is transmitted to a computer associated with an issuer of the payment instrument (or a designated manager acting on behalf of the issuer) for approval or denial of the transaction.

In some other payment systems, policies and rules may be provided to the payment network, e.g., by an issuer, and each received transaction is evaluated based on the policies and/or rules to either approve or deny the transaction. In the interest of efficient transaction processing, an outer (or upper) bound is usually specified; in some implementations, the time available (or made available) for approving or denying transactions is typically limited, e.g., 5 seconds, 7 seconds, etc.

Techniques of this disclosure enable dynamic monitoring of a user context based on received data, and thereby enable pre-processing of data that is relevant to approval and/or denial of transactions. Dynamic and predicted adjustment of payment attributes ensures that a portion of the computations, rules evaluation, policy evaluation, and/or decision workflows are performed well-ahead of the transaction request itself. Such design of the payment processing workflow can ensure that the limited time budget to provide authorization can be met.

User context may be utilized to further dynamically adjust the payment attributes based on a detected user context. Context states are determined based on data that is automatically received from one or more user devices, e.g., mobile phones, tablets, on-board computers, transponders fitted on vehicles, computer systems, etc.

In some implementations, a software application (App) may be installed on a user device to enable determination of user context. The App may be configured such that it is either always-on, or may be activated during a time when a user intends to undertake a financial transaction. The software application may be provided with suitable user permissions to enable context monitoring, collection of data elements from one or more sensors, transmit data elements and metadata elements to a payment instrument management system, etc.

The data may include data elements, e.g., image data, location data, etc., as well as metadata elements, e.g., a time of image capture, a location of image capture, a method of authentication, etc., associated with one or more the data elements received.

In some implementations, prediction techniques such as Kalman filtering, Wiener filtering, etc., may be utilized to determine future states of one or more parameters being tracked based on a current state and previous states of the parameter(s).

In some implementations, a current state and previous states may be provided to a machine learning model (ML) in order to determine a predicted state of one or more parameters. For example, in a fleet payment instrument management solution, a clustering algorithm may be applied to tuples of data that include location data, timestamp data, driver data fuel event data vehicle data, vehicle load data, etc. to determine a likelihood of a fuel event for a particular vehicle on a trip.

The ML model may be trained based on historical data. Historical data may be organizational (e.g., other employees within an organization), industry specific (e.g., across companies within the same industry), and/or across organizations/industry (e.g., aggregated data). The system may also consider preferences, patterns, or settings configurable by each user and/or company. The input data to the clustering algorithm may include historical data from previous trips of the driver, data from trips undertaken by other vehicles in the fleet, and aggregated data from other fleets.

In some implementations, a transaction likelihood score may be calculated that may be indicative of a degree of validity of a future transaction. A high score for a future transaction may indicate a high degree of validity, and thus a low likelihood of fraud or misuse, whereas a low transaction likelihood score may be indicative of a low degree of validity and thus a higher chance of being a fraudulent or misused transaction.

In some implementations, based on a computed transaction likelihood score, one or more payment attributes may be updated and/or adjusted, e.g., at a computing device associated with a payment network. In some implementations, a policy or rule may be adjusted or updated based on a computed transaction likelihood score.

For example, a payment instrument may be configured such that it is not valid for use with any merchant category code (MCC), and thus be configured in an inactive state. Based on a computed transaction likelihood score, one or more MCC codes may be turned on (e.g., approved for transactions), and one or more transaction limits may be adjusted.

Approval of transactions may have a very limited time budget, and may present computational challenges in the accurate determination of a user context state. Techniques described herein may be utilized to predict context states accurately, and mitigate misuse and fraudulent transactions, while still meeting a provided computational and time budget. A high availability architecture for transaction processing and providing authorizations for transactions is also described.

The techniques described herein also increase transaction security by detecting a likelihood of fraud even before a fraudulent transaction is undertaken, which provides significant advantages over detection of fraud, post-transaction.

FIG. 1 is a diagram of an example system environment for dynamic and predictive adjustment of payment attributes based on contextual data and metadata, in accordance with some implementations.

As depicted in FIG. 1, the system environment includes a payment instrument management system 110, which is connected via network 160 to a fleet management system 120, and one or more payment networks 140.

User devices 130a-130n and merchant computer systems 150a-150n are also connected to the network and are configured to transmit and receive signals and/or messages from one or more of fleet management system 120, payment network 140, and payment instrument management system 110.

A user device 130 a-130n can be any computer system or device used by a person or entity seeking to provide transaction information to a merchant computer system, a fleet management system, or a payment instrument management system. Thus, the user device 130 may be represented by a laptop or desktop computer 130a, a user mobile device 130n, or one or more other types of user devices (e.g., on-board computers, wearable devices, tablet computers, etc.). There may be more or fewer user devices than those shown in FIG. 1, as represented by ellipses. A user can be any person, whether a person (e.g., employee) or organization, that enters or otherwise provides transaction/transaction data, authentication data, location data, etc. The user devices 130 a-130n can communicate with a network 160 to transmit (send) or receive data or other communications to/from any of the coupled systems and/or computing devices.

The merchant computer systems 150a-150n are associated with vendors and merchants that provide services/goods to users (e.g., fuel stations, charging stations, repair stations, vehicle wash stations, airlines, restaurants, hotels, car rentals, transportation services, etc.). The merchant computer systems 150a-150n may be associated with a particular computer system or device, such as a point of service (POS) terminal device that processes transactions for the merchants.

Fleet management system 120 may be any combination of computer systems utilized by a fleet for the management of its operations, e.g., to provide route and dispatch data via network 160 to the payment instrument management system 110.

Payment network 140 may be a combination of computer systems associated with one or more payment networks that process transactions and payments. Communications between payment network systems 140 and a payment instrument management system 110 may be implemented via network 160 as well as via direct connections.

Network 160 can be any distributed processing network used to communicate information between two or more computer systems. The network 160 may include any type of known communication medium or collection of communication media and may use any type of protocols to transport messages between devices. In some implementations, the network 160 may also represent phone systems or other means of communicating information from a user device to the payment instrument management system 110 and/or other components, from the merchant computer systems 150 to payment instrument management system 110 and/or other components, from the payment networks 140 to the payment instrument management system 110 and/or other components. Thus, the network 160 can represent systems or networks for completing transactions or other types of communication systems. The network 160 can be an intranet, the Internet, the World Wide Web, etc. In other embodiments, the network 160 may be a public switched telephone network (PSTN) or other type of phone system.

The network 160, in some embodiments, may also include a WAN or LAN. Alternatively, or additionally, the network 160 may include one or more devices that are not administered by the same entity administering the payment instrument management system 110. The Internet is an example of the network 160 that constitutes an IP network consisting of many computers, computing networks, and other communication devices located all over the world, which are connected through many telephone systems and other means. Other examples of the network 160 include, without limitation, a standard Plain Old Telephone System (POTS), an Integrated Services Digital Network (ISDN), the Public Switched Telephone Network (PSTN), a cellular network, and any other type of packet-switched or circuit-switched network known in the art.

Figure 2:
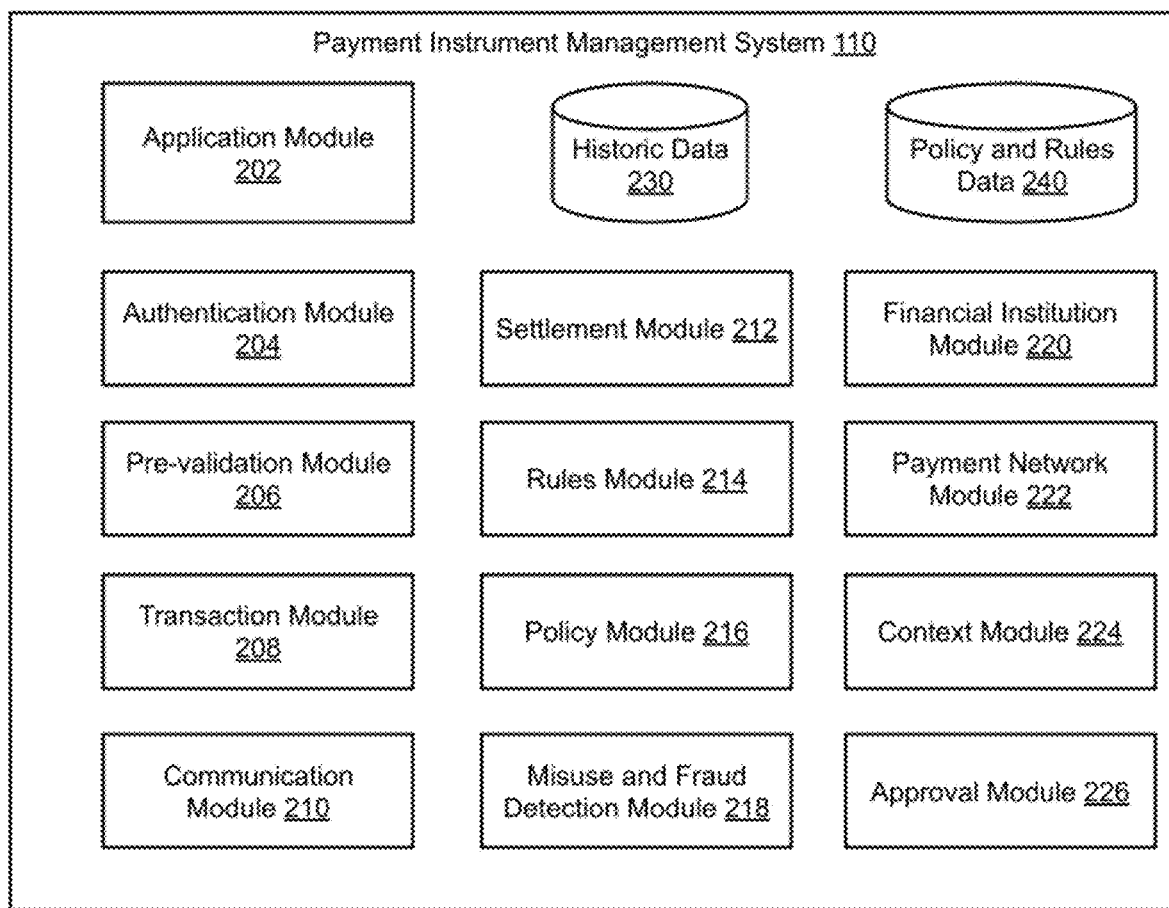
FIG. 2 depicts an example payment instrument management system, in accordance with some implementations.

FIG. 2 depicts an example payment instrument management system, in accordance with some implementations.

An example implementation of a payment instrument management system is described in conjunction with FIG. 2, which is representative of any system or collection of systems in which the various applications, services, scenarios, and processes disclosed herein may be implemented. Payment instrument management system 110 may be employed to execute a payment instrument management service on behalf of a financial institution, on behalf of an enterprise, e.g., fleet management system, such as the one described herein.

The payment instrument management system 110 may include a number of processor readable software modules that, when executed by the processor, perform functions described herein. The modules may also be implemented on one or more distributed computing systems, and instances, processes, and/or functions may be utilized to perform the described functions.

The payment instrument management system 110 includes an authentication module 204 that securely authenticates users, vehicles, vendors, companies, etc., using one or more single-factor or multi-factor authentication indicia. Exemplary indicia comprise something the object or knows, something the object has, and something the object is.

The payment instrument management system 110 includes a pre-validation module 206 that determines a likelihood of a future transaction based on context data. The pre-validation module may include a machine learning module that learns from previous transactions and creates and augments context data, rules, and/or learnings to continually improve accuracy of the payment instrument management system. The pre-validation system can also include a context module that can apply deterministic rule sets and heuristic rule sets. The payment instrument management system 110 includes a rules module 214 that is utilized for resolving rules and a policy module 216.

The payment instrument management system 110 includes a communication module 210 that enables inter-device communications between the payment instrument management system 110 and devices associated with the payment networks, fleet management systems, financial institutions, merchants, companies, and any connected databases. The various modules are in communication via a signal transmission medium, such as a bus, local network, wide area network, and the like.

The communication module 210, when executed by the processor, may enable the payment instrument management system 110 to communicate with the other devices in the system 100. For instance, the communication module 210 may be configured to modulate/demodulate communications exchanged over the network 160, determine timings associated with such communications, determine addresses associated with such communications, etc. In some embodiments, the communication module 210 may be configured to allocate communication ports of the transaction monitor 101 for use as a communication interface. The communication module 210 may further be configured to generate messages in accordance with communication protocols used by the network 160 and to parse messages received via the network 160.

The payment instrument management 110 includes a transaction module 208 for processing transactions and a settlement module 212 for processing transaction settlement data. A misuse and fraud detection module 218 is included for detecting fraudulent and misuse activity using a payment instrument based on detected data patterns.

The payment instrument management system 110 includes a financial institution module 220 to interact with financial institutions that issue physical or digital financial instruments used to complete transactions.

A payment network module 222 may be utilized to interact with payment networks and process received messages and transmit messages that are utilized to make one or more adjustments and/or updates to payment attributes stored on devices associated with the payment networks. The payment instrument management system 110 includes a context module 224 for determining context data for transactions (including a context feedback loop).

The payment instrument management system 110 includes an approval module 226 that approves or denies transactions received by the payment instrument management system.

The payment instrument management system 110 may include one or more databases, e.g., a historical database 230, and a policy and rules database 240.

Figure 3A:
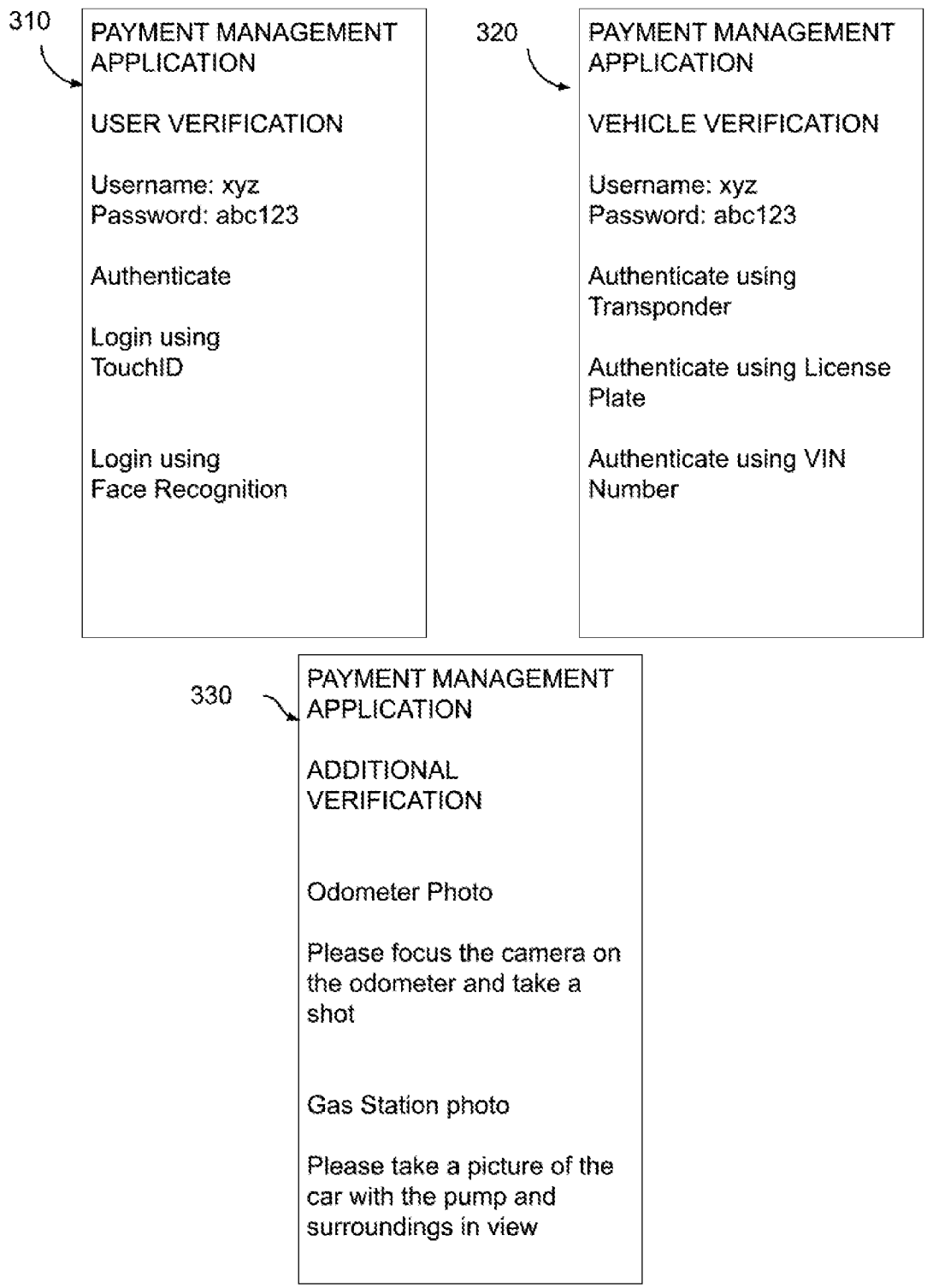
FIGS. 3A and 3B depict example screenshots of user interfaces of a user device utilized in conjunction with a payment instrument management system, in accordance with some implementations.
Figure 3B:
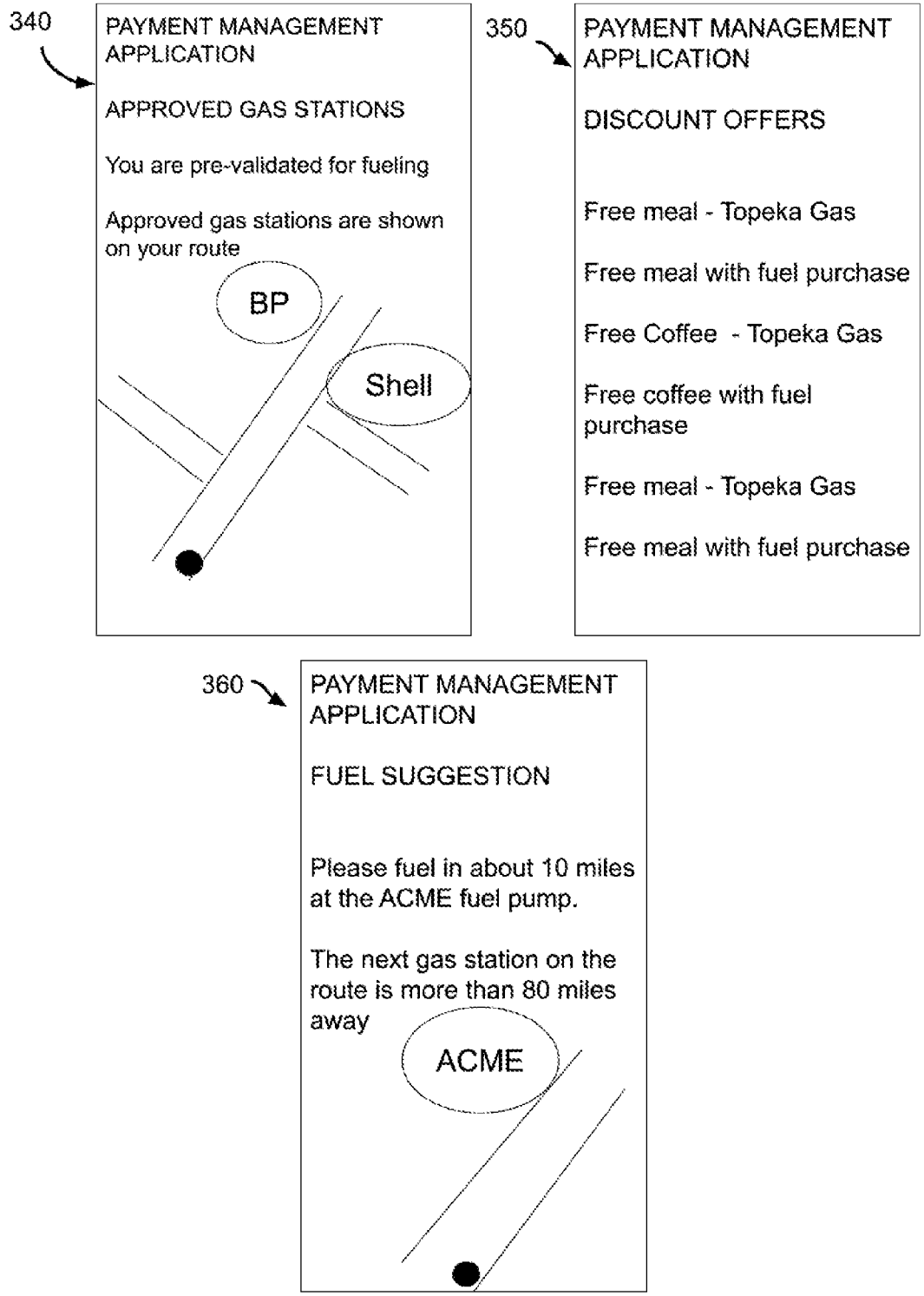

FIGS. 3A and 3B depict example screenshots of user interfaces of a user device utilized in conjunction with a payment instrument management system, in accordance with some implementations.

In some implementations, a user device, e.g., a mobile device of a user (driver) is utilized to obtain contextual data as well as to provide notification(s) to the user. In this illustrative example, techniques as applied in a fleet management context are described.

A software application of the payment (instrument) management system is configured to execute on the user device. The software application may be made available to users for download. In some implementations, installation and execution of the software application may be specified as a requirement for users to be able to access one or more payment instruments.

A first screenshot (310) illustrates an example user verification screen. In some implementations, a user may provide their credentials, e.g., username, password, PIN etc., to sign into the software application. Multiple modes of authentication, including face recognition, and fingerprint recognition may be utilized to perform user authentication.

A second screenshot (320) depicts an example vehicle verification screen. In some implementations, a user may be prompted to authenticate a vehicle being utilized for the trip. Authentication of the vehicle may be supported via a transponder, via an image of a license plate, an image of a VIN number plate, an image of an odometer, or by scanning other indicia such as a QR code that may be located in the vehicle, where the QR code is unique to the vehicle.

A third screenshot (330) depicts an example of additional verification that may be utilized in some scenarios. An image of an odometer of the vehicle or vehicle surroundings may be requested via the user device. The user interface is enabled to guide the user to take a picture by providing a guiding frame as well as by providing directions to the user to suitably move the user device to obtain an image that meets certain specifications.

Per techniques of this disclosure, a fuel likelihood score may be calculated based on received trip data, and when the fuel likelihood score meets a predetermined threshold, a payment instrument associated with the user device (and user) may be pre-validated for fuel transactions.

A fourth screenshot (340) depicts an example screenshot that indicates successful pre-validation. The successful pre-validation may also be depicted on a map on the user device that indicates approved fuel locations along a proposed route of the user.

Additional indicators (not shown) may be utilized. For example, a green indicator (e.g., a green dot) on the user interface of the software application may serve as an indicator that the payment instrument is approved for fueling, a yellow indicator that additional verification data is needed before successful pre-validation of the payment instrument, and a red indicator that pre-validation is unlikely.

A fifth screenshot (350) depicts an example screenshot where discount offers may be displayed to the user via their user device. Advisories and suggestions may be provided to a user via the user interface based on received trip data. The advisories and/or suggestions may originate from the payment instrument management system, a payment management system, or from a fleet management system, and be displayed on the user device. A sixth screenshot (360) depicts an example of a notification that may be provided. For example, if it is determined that the vehicle is located near the only fuel station for a certain distance from a current location, and based on trip data, if it is estimated that the fuel level is low, a notification may be provided recommending a fueling.

Figure 4A:
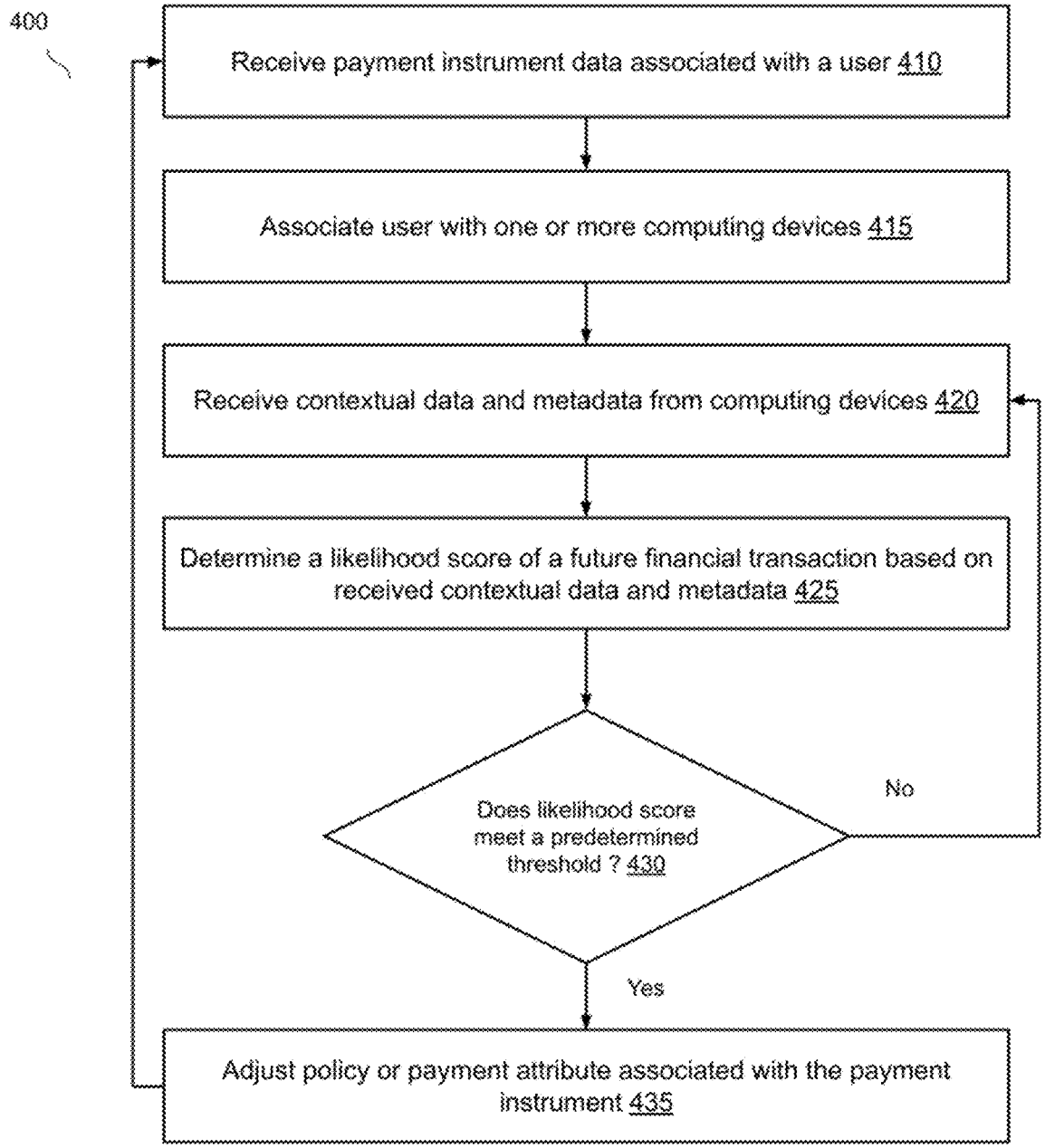
FIG. 4A is a flowchart that depicts an example method for dynamic and predictive adjustment of payment attributes based on contextual data and metadata, in accordance with some implementations.

FIG. 4A is a flowchart that depicts an example method for dynamic and predictive adjustment of payment attributes based on contextual data and metadata, in accordance with some implementations.

In some implementations, method 400 can be implemented, for example, on a payment instrument management system 110 described with reference to FIG. 1. In the described examples, the implementing system includes one or more digital processors or processing circuitry ("processors"), and one or more storage devices. In some implementations, different components of one or more servers and/or clients can perform different blocks or other parts of the method 400. In some examples, a first device is described as performing blocks of method 400. Some implementations can have one or more blocks of method 400 performed by one or more other devices (e.g., other client devices, over a distributed computer system, or server devices) that can send results or data to the first device.

In some implementations, the method 400, or portions of the method, can be initiated automatically by a system. In some implementations, the implementing system is a first device. For example, the method (or portions thereof) can be periodically performed, or performed based on one or more particular events or conditions, e.g., a change in a detected user context, a signal received from a card/payment processor, and/or one or more other conditions occurring which can be specified in settings read by the method.

Processing may begin at block 410.

At block 410, payment instrument data may be received that is associated with one or more payment instrument(s) that are associated with a particular user.

The payment instrument data can include data elements associated with the payment instrument, e.g., a payment instrument identifier(s), user identifier(s), budgetary limits on the payment instrument(s), etc.

The payment instrument can be any type of payment instrument, e.g., a physical card with a card number, a virtual card, a wallet, a bank account, etc.

Block 410 may be followed by block 415.

At block 415, one or more computing devices are associated with the user. The one or more computing devices may include user devices, e.g., a mobile phone associated with the user, a desktop, tablet, or laptop computer associated with the user; storage devices and specifically, data structures associated with the user, etc.

Block 415 may be followed by block 420.

At block 420, contextual data and metadata associated with the contextual data may be received from the computing devices.

Block 420 may be followed by block 425.

At block 425, a likelihood score for a future financial transaction is determined based on the received contextual data and metadata.

For example, contextual data may be received from one or more user devices, as well as from one or more enterprise computer systems. For example, if an organization and/or user provides permission for the payment instrument management system to access calendar data from the user's calendar app, and/or other apps installed on the user's device, the calendar data may be used as attribute and/or context data. Contextual data may be also determined from publicly available information sources that may be accessed, e.g., via an application programming interface (API). For example, flight arrival and departure information, traffic data, weather data, etc., may be utilized as context data.

In some implementations, user devices and data elements and metadata elements received from the user device(s) may be utilized for additional context. For example, if it is determined that a user is traveling and not at their desk, a transaction originating (or purporting to originate) from their desktop computer may be unlikely to be a valid transaction. Accordingly, an inferred state of mobility of the user may be utilized to refine the user context.

Block 425 may be followed by block 430.

At block 430, it is determined whether the likelihood score meets a predetermined threshold, e.g., a confidence threshold.

If it is determined that the likelihood score meets the predetermined threshold, block 430 may be followed by block 435, else, block 430 may be followed by block 420.

At block 435, one or more payment attributes or policies associated with the payment instrument(s) may be adjusted.

For example, an MCC code for a payment instrument may be activated only upon a determination of a valid and likely future transaction that utilizes the payment instrument. Depending on the payment architecture, e.g., in a payment network that supports balance enquiry, a pre-authorization amount or policy may be adjusted based on the transaction likelihood score. Similarly, a merchant or merchants in a certain geofenced region may be pre-validated or pre-approved for a transaction based on user location data and a determination that the user is likely to transact in the geofenced region.

Techniques described herein may be utilized to provide faster transaction processing, by reducing a time needed for performing certain computations and to reduce computational loads when the actual transaction is initiated, e.g., by a card swipe, or wallet transaction, etc., that leads to an authorization request transmitted.

Blocks 410-435 can be performed (or repeated) in a different order than described above and/or one or more steps can be omitted.

Figure 4B:
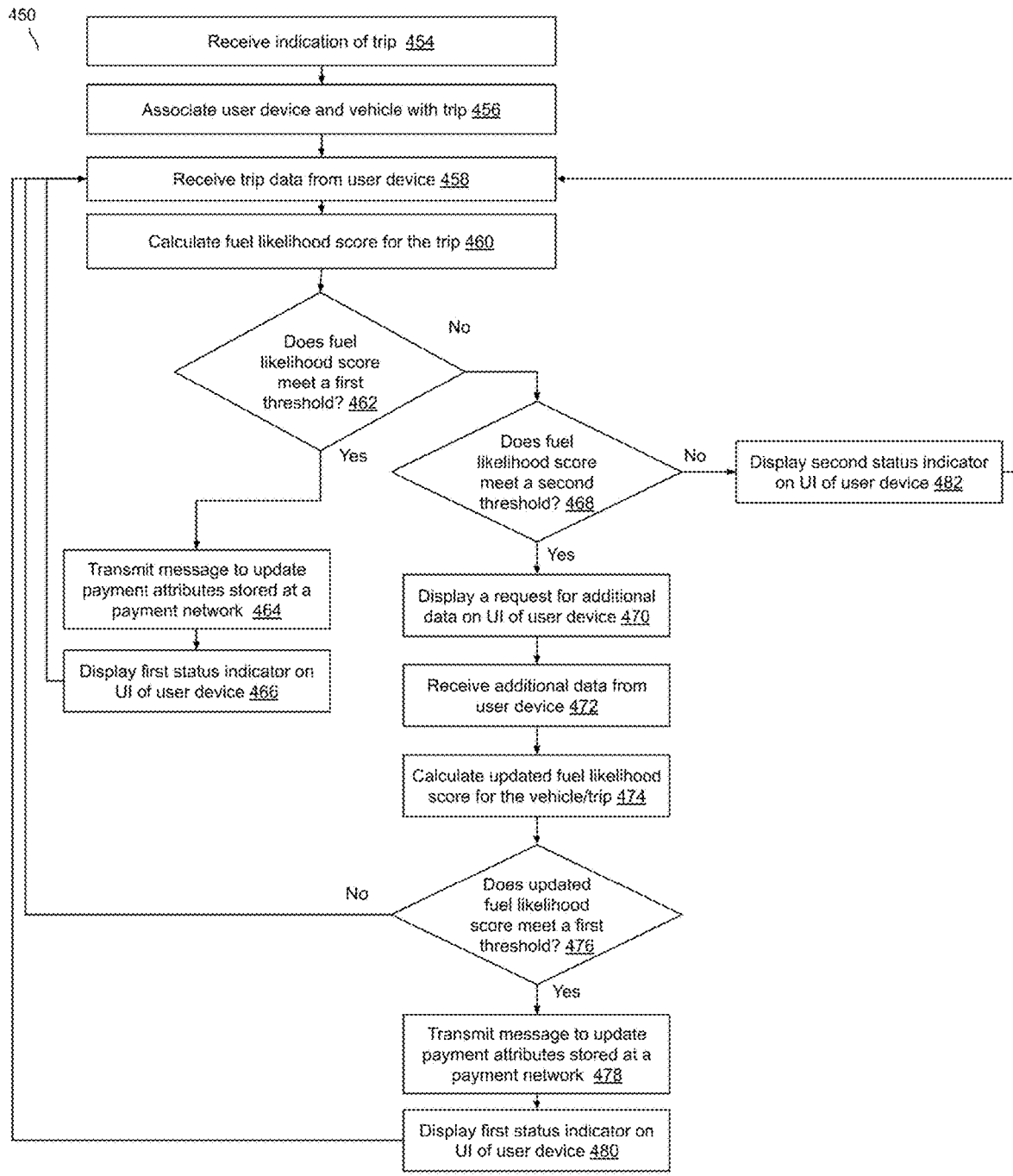
FIG. 4B is a flowchart that depicts an example method to update a payment attribute of a payment instrument, in accordance with some implementations.

FIG. 4B is a flowchart that depicts an example method to update a payment attribute of a payment instrument, in accordance with some implementations.

In some implementations, method 450 can be implemented, for example, on a payment instrument management system 110 described with reference to FIG. 1. In the described examples, the implementing system includes one or more digital processors or processing circuitry ("processors"), and one or more storage devices. In some implementations, different components of one or more servers and/or clients can perform different blocks or other parts of the method 450. In some examples, a first device is described as performing blocks of method 450. Some implementations can have one or more blocks of method 450 performed by one or more other devices (e.g., other client devices or server devices) that can send results or data to the first device.

In some implementations, the method 450, or portions of the method, can be initiated automatically by a system. In some implementations, the implementing system is a first device. For example, the method (or portions thereof) can be periodically performed, or performed based on one or more particular events or conditions, e.g., reception of fresh trip data, a signal received from a user device or a payment network, and/or one or more other conditions occurring which can be specified in settings read by the method.

Method 450 may begin at block 454.

At block 454, an indication and/or signal of a trip being undertaken by a vehicle may be received by a computing device comprising a processor and memory.

In some implementations, the indication may be determined based on a received signal from a user device, e.g., a sign in, or be based on detection of a movement of location of a user device. For example, the inference may be based on receipt of data from a user device from a first location and a second location, at different times.

In some implementations the indication may be received from a fleet operator computer system. In some implementations, the indication may be received at a computer device, from a software application (App) executing on a user device. In some implementations, the indication may be transmitted based on user input at a commencement of a trip. The user device may be associated with a driver or user of the vehicle and the indication may include additional data, e.g., identifier of a user device, vehicle identifier, etc.

In some implementations, a user and/or a vehicle may be authenticated. For example, a user may be authenticated using additional authentication measures, e.g., requiring a user to enter an alphanumeric PIN, enter a multi-factor authentication key that is transmitted by the computer device to a known and trusted device associated with the user, provide biometric data such as fingerprint and/or facial biometric data.

In some implementations, a vehicle may be authenticated based on a received image of a vehicle license plate, a QR code or other indicia located on the vehicle, a vehicle VIN number plate, and/or a vehicle odometer. The received images may be verified based on previously obtained/received and stored images on a database associated with the payment instrument management system.

In some implementations, an indicium that is attached to a vehicle may be utilized for authentication. For example, a QR code affixed to an interior of the vehicle may be utilized. The user may be requested to scan the QR code using their user device, which may then be received at the payment instrument management system based on a message transmitted by the user device.

In some implementations, a payment instrument associated with the trip and/or user may also be authenticated based on accessing a database that includes stored data about payment instruments issued to employees or based on a user entry of a payment instrument identifier, and/or be combined with an image (of a physical card or other payment instrument) or an alphanumeric identifier or token received from an application executing on a user device of the user. In some implementations, previously provided (and authenticated) payment instruments may be associated with a particular user based on historical data records.

In some implementations, the payment instrument is configured to be in an inactive state, e.g., be configured such that it is not eligible for transactions without a message/signal being transmitted to a payment network that adjusts one or more payment attributes of the payment instrument. For example, an MCC code for fuel purchases may be turned off as an initial state for the payment instrument. In some other implementations, the payment instrument may be configured such that selected transactions are permitted even without an adjustment of a payment attribute, e.g., be pre-approved (pre-validated) for emergency supplies, repair services, fuel transactions up to a specified monetary limit, etc.

In some implementations, fuel related data, e.g., an initial fuel state and/or odometer reading of the vehicle may also be obtained and stored as a reference for the trip. Fuel related data may be obtained based on image recognition of an odometer and/or fuel gauge, from a computing device associated with a fleet management system or based on data entered by a user via a user interface.

Block 454 may be followed by block 456.

At block 456, a user device and a vehicle (identifier) are associated by the computer device with the trip.

In some implementations, the user device and a vehicle identifier are associated with the trip based on the received and authenticated data, whereas in some implementations, previously received route data and/or historic data may also be utilized for the association.

Subsequent to their association, data received from the user device is utilized as a surrogate for vehicle data, unless conflicting data is received.

Block 456 may be followed by block 458.

At block 458, trip data that includes at least location data obtained from the user device is received by the computer device. In some implementations, the trip data is received from a software application (App) executing on a user device of a user of the vehicle.

In some implementations, transmission of the trip data may be configured such that it may be received at a predetermined periodicity (time-interval). The periodicity may be dynamically adjusted based on a time and/or distance elapsed since the commencement of the trip. Adjustable periodicity may help conserve battery life for the user device by not requiring frequent transmission of data and maintaining network connectivity during the trip.

In some implementations, trip data may be collected at a first frequency locally at the user device and transmitted by the user device at a second (e.g., a lower) frequency. Additionally, the software application may be configured such that sensors on the user device are also activated only when data is to be obtained. For example, a GPS sensor on the user device may be configured such that it is activated only when location data is to be obtained from the user device, thereby extending battery life of the user device.

In some implementations, the trip data may be received as a plurality of (data) packets transmitted from the application at a first periodicity that is based on a time elapsed since an estimated time of commencement of the trip and/or a distance elapsed since the commencement of the trip. In some implementations, the periodicity may be based on a user device battery status.

In some implementations, the trip data is received based on a particular periodicity, or based on an event threshold, e.g., a certain mileage being driven. In some implementations, the trip data is received as a response to a ping transmitted from the payment instrument management system.

In some implementations, if a ping of the user device does not elicit a response, a specified pre-authorization may be communicated to a payment network based on an agreement or arrangement with the fleet manager/fleet management system setting.

In some implementations, the trip data may include one or more of location data, accelerometer data, connectivity data such as an identity of a network operator, speed/velocity data, battery status of a user device, etc.

In some implementations, the trip data may be a combination of automatically sensed data and user entered data. For example, a user may initiate a request to pre-validate a future transaction that is received at the payment instrument management system, and the received request may include one or more of a requested budget or fuel amount, a current fuel status, location information, average mileage during the trip, an intended fuel pump location or other fuel pump details.

The trip data may also include one or more images, metadata associated with the one or more images, and metadata associated with the user device. For example, the one or more images may include an image of an odometer and/or a dashboard of the vehicle.

In some implementations, a software application may be configured to collect and store trip data, and subsequently transmit for reception by the payment instrument management system. For example, during a time when a user device does not have network connectivity, the software application may be configured to operate in an offline mode, and monitor a user context, obtain data elements and metadata elements for transmitting to the payment instrument management system upon restoration of user device connectivity.

In some implementations, in an offline mode, the software application may display on the user device a message about locations on the route where network connectivity is available (based on previously received trip data and/or historic data). For example, the network connectivity at a location on the route may be provided by an operator of an establishment such as a fuel station, e.g., Wifi, Bluetooth, NFC, or other connectivity provided at the location where the user device may be utilized to provide additional data elements and metadata elements to enable pre-validation before a transaction.

In some implementations, the payment instrument management system may verify, based on historical data, that a network operator associated with the user device (cellular operator, roaming partner of the cellular operator, etc.) does not have network coverage at a particular location. Upon restoration of network connectivity, data already captured on a software application may be transmitted to the payment instrument management system.

In some implementations, during conditions where the user device has limited or no network connectivity, instructions may be provided to the user (in offline mode) to proceed to enter payment instrument data, e.g., card number, wallet data, tokens, etc. at a fuel pump. In such implementations, transaction approval may be provided by the payment network, e.g., for a limited authorization amount. In some implementations, it may be confirmed that connectivity for a network operator associated with the user device operator is indeed limited or not available, e.g., based on user device history of connected networks, or confirmation of a low battery state of the user device.

Block 458 may be followed by block 460.

At block 460, a fuel likelihood score for the first trip is calculated based on the received trip data. The fuel likelihood score is indicative of a degree of validity of a fuel transaction. In some implementations, the fuel likelihood score may be a confidence score associated with a valid future transaction based on the received trip data, e.g., current mileage, the metadata associated with one or more images, location, time of request, etc.

The fuel likelihood score may be computed using different methodologies. In some implementations, the fuel likelihood score is calculated, based on a determination, at a computing device of the payment instrument management system, of a traveled distance, a quantity of fuel consumed, a quantity of fuel remaining in the vehicle, and/or an expected fuel quantity. The determination may be based on the received trip data, e.g., received location data, received image(s) of an odometer, etc.

In some implementations, calculating the fuel likelihood score may include analyzing the received image data and the received image metadata to determine one or more of an odometer mileage, an estimated fuel level, and/or a distance traveled since a previous fueling event.

In some implementations, received data elements and metadata elements may be verified. For example, a time and location of capture of a received odometer image may be verified against a time and location of transmission of the data; it may be verified that a received odometer image matches an odometer image previously received by matching its background. Similarly, pixel subtraction may be utilized using a previous odometer image to verify the odometer image and to enable faster extraction of mileage data from the odometer image.

In some implementations, the received trip data may be supplemented by telemetric data from a transponder associated with the vehicle. The telemetric data may include one or more data elements, e.g., location data, fuel level data, speed data, and fuel efficiency data.

In some implementations, calculating the fuel likelihood score may include applying a trained machine learning (ML) model to the trip data.

Features such as driver information, driver history, driver credit score, average mileage, last known location, connection history at location, a method of authentication, e.g., biometric authentication, facial recognition based authentication, fingerprint based authentication, PIN based authentication, etc., a fuel state at a start of the trip, a time elapsed, a vehicle type, etc; may be provided to the ML model to enable determination of the fuel likelihood score, and a corresponding confidence interval for the score. Additional details of fuel likelihood score(s) are described with reference to FIG. 7.

Block 460 may be followed by block 462.

At block 462, it is determined whether the fuel likelihood score for the trip and/or vehicle meets a first threshold.

In some implementations, the first threshold may be an indicator that the vehicle associated with a trip has a relatively high likelihood of needing to be fueled.

If it is determined that the fuel likelihood meets the first threshold, block 462 may be followed by 464, else block 462 may be followed by block 468.

At block 464, based on a determination that the fuel likelihood score meets the first threshold, a message, e.g., over a http or https channel, may be transmitted to a computer associated with a payment network to update one or more payment attributes associated with the payment instrument. The payment attributes may be attributes, parameters, and or configuration settings that are stored in a device of the payment network.

For example, a message to unblock an MCC code for a fuel category may be transmitted to a computer associated with a payment network, based on the fuel likelihood score meeting a predetermined first threshold.

In some implementations, the payment attributes may be adjusted only for pumps in the direction of travel (based on an extrapolation of current trip data) that matches route information transmitted to the payment instrument management system.

Block 464 may be followed by block 466.

At block 466, an indication that the payment instrument is approved for a future fuel transaction is displayed on an application executing on the user device. For example, a list of approved fuel pumps (e.g., indicated by a check mark, or highlighted in a particular color) may be displayed on a map along with a current location.

In some implementations, the indication may be a notification (e.g., a notification code) transmitted to the user device, which is displayed on a user interface of the user device by the software application executing on the user device.

In some implementations, the indication may be a text message that is transmitted to the user device, e.g., over a cellular network. In some implementations, the indication may be displayed on an in-vehicle display.

Subsequent to the transmission of a message to the payment network, an authorization request may be received from the payment network for a transaction, e.g., a fuel transaction. For example, a request may be received at two or more groups of authorization control pods associated with the payment instrument management system, an authorization request from the payment network for a fuel transaction, wherein the authorization request includes an identifier associated with the payment instrument and transaction information about the transaction. Each authorization control pod may include a processing service, a database service, and a policy agent.

The received request and the transaction information may be analyzed, at a corresponding policy agent of a single authorization control pod of the groups of authorization control pods by comparing one or more transaction attributes in the transaction information combined with contextual and historical (historic) data against one or more policies stored in the database service. Based on the comparison, one of an approval or a rejection of the transaction may be transmitted (returned) to the payment network (e.g., a card processor).

In some implementations, the transaction attributes in the transaction information received from the payment network may include a pump location identifier, and analyzing the transaction information may include comparing the pump location identifier to the location data received from the user device. In some implementations, the transaction may be authorized only when there is a match of the pump location identifier with the location data received from the user device.

At block 468, based on a previous determination that the fuel likelihood score does not meet the first threshold, it is determined whether the fuel likelihood score meets a second threshold. In some implementations, the second threshold may be advantageously utilized in situations where additional trip data would enable a refinement (updating) of a fuel likelihood score, and the calculation of a more accurate fuel likelihood score.

If it is determined that the fuel likelihood score does not meet the first threshold and meets a second threshold, block 468 may be followed by block 470, else block 468 may be followed by block 482.

At block 470, a request for additional verification data is displayed or caused to be displayed on the application executing on the user device. The request may be displayed or caused to be displayed on the user device and may include a request for a capture and transmission of an image of one or more of an odometer, a dashboard, or a license plate of the vehicle.

In some implementations, the request may include a request for an image of a license plate of the vehicle and/or an image of an environment surrounding the vehicle, e.g., an image of a fuel pump, an image that shows other vehicles, an image that depicts a front and a rear of the vehicle, etc.

Block 470 may be followed by block 472.

At block 472, additional verification data may be received from the user device and may include the additional verification data, e.g., image data and corresponding image metadata.

Block 472 may be followed by block 474.

At block 474, an updated fuel likelihood score for the trip is calculated based on the additional verification data and the received trip data. The additional verification data received may be utilized to generate an updated location and/or an updated fuel state for the vehicle.

Block 474 may be followed by block 476.

At block 476, the updated fuel likelihood score is compared to the first threshold.

If it is determined that the updated fuel likelihood score meets the first threshold, block 476 may be followed by block 478, else block 476 may be followed by block 458.

At block 478, a signal/message is transmitted to a computer associated with a payment network, to update one or more payment attributes that are stored in a device of the payment network and wherein the one or more payment attributes are associated with the payment instrument.

Block 478 may be followed by block 480.

At block 480, an indication that the payment instrument is approved for the fuel transaction may be displayed or caused to be displayed. The indication may be provided on an application executing on the user device.

At block 482, a second status indicator or notification may be displayed on the user device specifying that the payment instrument is not pre-validated for a transaction. The user may be prompted to call a customer number in such a scenario. Block 482 may be followed by block 458.

A fuel likelihood score falling below a third threshold may be utilized as an indicator of more serious fraud issues, such as vehicle theft, etc. For example, the trip data received from a user device and/or vehicle transponder may indicate a vehicle location that is not inside a defined geofence. In such a scenario, an alert may be issued, or the vehicle be locked by transmitting a message to a vehicle controlling system.

Blocks 454-482 can be performed (or repeated) in a different order than described above and/or one or more steps can be omitted.

Figure 5:
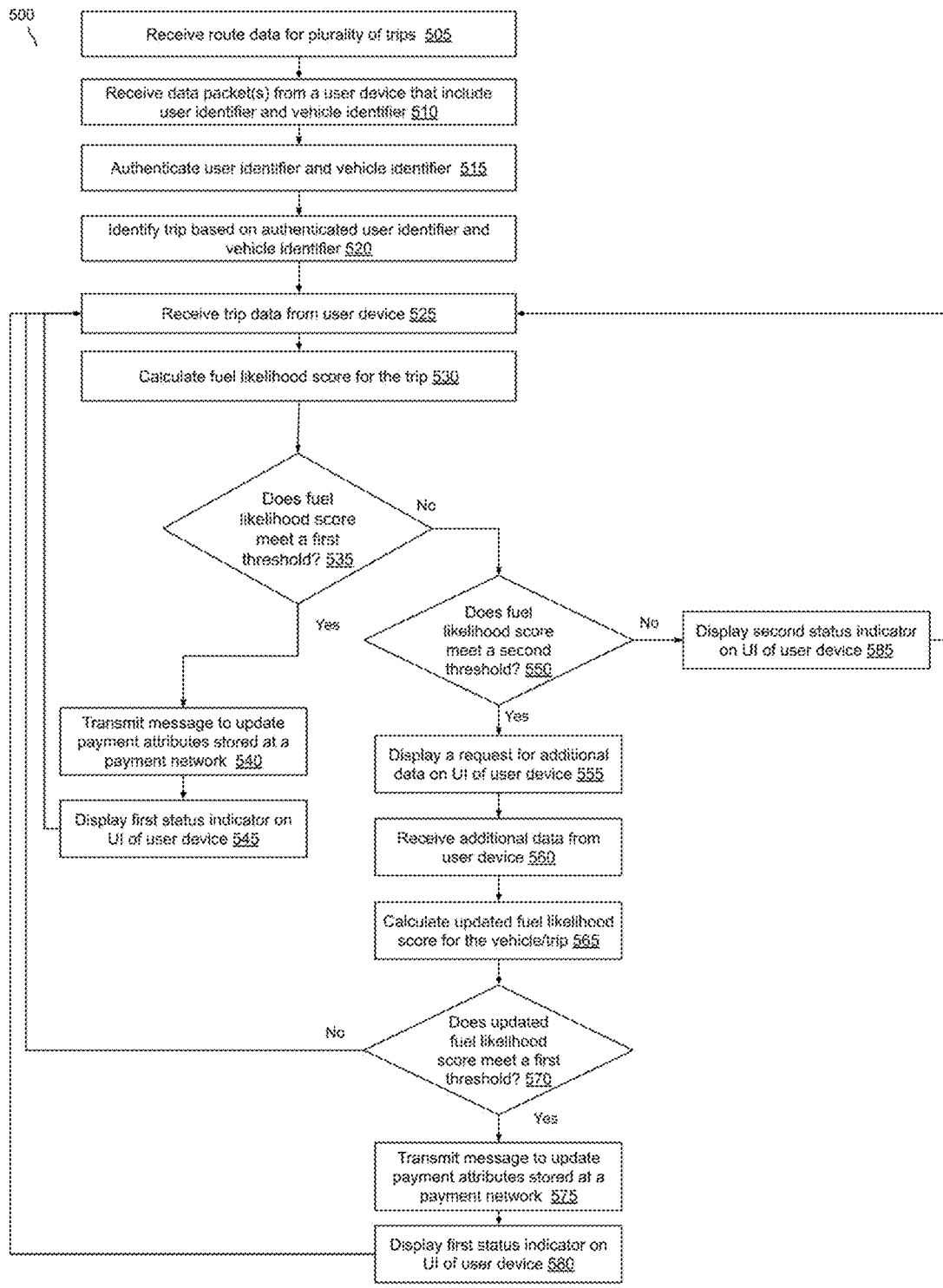
FIG. 5 is a flowchart that depicts another example method to update a payment attribute of a payment instrument, in accordance with some implementations.

FIG. 5 is a flowchart that depicts another example method to update a payment attribute of a payment instrument, in accordance with some implementations.

In some implementations, method 500 can be implemented, for example, on a payment instrument management system 110 described with reference to FIG. 1. In the described examples, the implementing system includes one or more digital processors or processing circuitry ("processors"), and one or more storage devices. In some implementations, different components of one or more servers and/or clients can perform different blocks or other parts of the method 500. In some examples, a first device is described as performing blocks of method 500. Some implementations can have one or more blocks of method 500 performed by one or more other devices (e.g., other client devices or server devices) that can send results or data to the first device.

In some implementations, the method 500, or portions of the method, can be initiated automatically by a system. In some implementations, the implementing system is a first device. For example, the method (or portions thereof) can be periodically performed, or performed based on one or more particular events or conditions, e.g., an indication of commencement of a trip, trip data received from a user device, a transaction request, a signal or message received from a payment network computer, and/or one or more other conditions occurring which can be specified in settings read by the method.

Method 500 may begin at block 505.

At block 505, route data for a plurality of trips may be received at a computing device. The route data may include a corresponding geofence region, a corresponding user (or driver) identifier, a corresponding payment instrument identifier, and a corresponding vehicle identifier for each trip of the plurality of trips.

In some implementations, the route data may include dispatch data that includes a planned route, an expected time of commencement of the trip, a vehicle identifier of a vehicle intended for use on the trip, and a user/driver for each trip of the route for a fleet that includes a plurality of vehicles.

In some implementations, a corresponding geofence may be specified by a combination of an origin location, a destination location, one or more intermediate locations, and one or more proposed routes of travel.

In some implementations, a corresponding geofence may be specified by specifying a particular region of travel, e.g., a specified area that may include one or more locations and an area surrounding the locations. For example, in some implementations, the geofence may be characterized by a polygon, a circle, or an irregular shape that includes one or more locations defined by a latitude and longitude and defined by a perimeter of the geofenced region.

Block 505 may be followed by block 510.

At block 510, a transmission of one or more data packets may be received from a user device, e.g., a mobile smartphone, a laptop computing device, a vehicle on-board computer, etc. The one or more data packets may be generated at a software application executing on the user device, wherein the one or more data packets comprise a user identifier. In some implementations, a mode of authentication of the user device may also be obtained. In some implementations, the one or more data packets may include data elements as well as metadata elements associated with corresponding data elements.

Block 510 may be followed by block 515.

At block 515, a user identifier and a vehicle identifier may be authenticated based on the received user and vehicle data and matching against previously received credentials and/or identifiers.

For example, a first vehicle may be identified based on a match of the received vehicle identifier with the received route data. A mobile device identifier and/or a user identifier may also be associated with a vehicle identifier, based on data entry or an image of a license plate or VIN number or from a previous association of a particular user (mobile) device with the vehicle.

The first trip data and any received telemetric data may be stored in a linked data structure for future authentication and for training a machine learning (ML) model.

Block 515 may be followed by block 520.

At block 520, a first trip of the plurality of trips may be identified based on a match of the authenticated user identifier and the authenticated vehicle identifier with the route data. In some implementations, the first trip may additionally be associated with a first payment instrument.

Block 520 may be followed by block 525.

At block 525, trip data is received from the authenticated user device.

The first trip data may be received as a plurality of packets transmitted from the software application at a first periodicity that is based on one or more of a time elapsed since an estimated time of commencement of the trip and/or a distance elapsed since the commencement of the trip.

Block 525 may be followed by block 530.

At block 530, a fuel likelihood score is calculated for the trip. The fuel likelihood score is indicative of a degree of validity of a fuel transaction. In some implementations, the fuel likelihood score may be a confidence score associated with a valid future transaction based on the received trip data, e.g., current mileage, the metadata associated with one or more images, location, time of request, etc.

The fuel likelihood score may be computed using different methodologies. In some implementations, the fuel likelihood score is calculated, based on a determination, at a computing device of the payment instrument management system, of a traveled distance, a quantity of fuel consumed, a quantity of fuel remaining in the vehicle, and/or an expected fuel quantity. The determination may be based on the received trip data, e.g., received location data, received image(s) of an odometer, etc.

In some implementations, calculating the fuel likelihood score may include analyzing the received image data and the received image metadata to determine one or more of an odometer mileage, an estimated fuel level, and/or a distance traveled since a previous fueling event.

In some implementations, received data elements and metadata elements may be verified. For example, a time and location of capture of a received odometer image may be verified against a time and location of transmission of the data; it may be verified that a received odometer image matches an odometer image previously received by matching its background. Similarly, pixel subtraction may be utilized using a previous odometer image to verify the odometer image.

In some implementations, the received trip data may be supplemented by telemetric data from a transponder associated with the vehicle. The telemetric data may include one or more data elements, e.g., location data, fuel level data, and fuel efficiency data.

In some implementations, calculating the fuel likelihood score may include applying a trained machine learning (ML) model to the trip data.

Features such as driver information, driver history, driver credit score, average mileage, last known location, connection history at location, a method of authentication, e.g., biometric, face based, fingerprint based, PIN based, etc., a fuel state at start, a time elapsed, a vehicle type, etc., may be provided to the ML model to enable determination of the fuel likelihood score, and a corresponding confidence interval for the score. Additional details of fuel likelihood score(s) are described with reference to FIG. 7.

Block 530 may be followed by block 535.

At block 535, it is determined whether the fuel likelihood score for the trip and/or vehicle meets a first threshold. If it is determined that the fuel likelihood score for the trip and/or vehicle meets the first threshold, block 535 may be followed by block 540, else block 535 may be followed by block 550

At block 540, based on a determination that the fuel likelihood score meets the first threshold, a message may be transmitted, e.g., over a http or https channel, to a computer associated with a payment network to update one or more payment attributes associated with the payment instrument. The payment attributes may be attributes, parameters, and/or configuration settings that are stored in a device of the payment network.

For example, a message may be transmitted from the processor to a computer associated with a payment network, wherein the message includes a request or command to unblock a merchant category code (MCC) for a fuel category based on the fuel likelihood score meeting a predetermined first threshold.

Block 540 may be followed by block 545.

At block 545, an indication that the payment instrument is approved for a future fuel transaction is displayed on an application executing on the user device. For example, a list of approved fuel pumps (e.g., indicated by a check mark, highlighted in a particular color, etc.) may be displayed on a map along with a current location.

In some implementations, the indication may be a notification (e.g., a notification code) transmitted to the user device, which is displayed on a user interface of the user device by the software application executing on the user device.

In some implementations, the indication may be a text message that is transmitted to the user device, e.g., over a cellular network. In some implementations, the indication may be displayed on an in-vehicle display.

Subsequent to the transmission of a message to the payment network, an authorization request may be received from the payment network for a transaction, e.g., a fuel transaction. For example, a request may be received at two or more groups of authorization control pods associated with the payment instrument management system, an authorization request from the payment network for a fuel transaction, wherein the authorization request includes an identifier associated with the payment instrument and transaction information about the transaction. Each authorization control pod may include a processing service, a database service, and a policy agent.

The received request and the transaction information may be analyzed, at a corresponding policy agent of a single authorization control pod of the groups of authorization control pods by comparing one or more transaction attributes in the transaction information combined with contextual and historical (historic) data against one or more policies stored in the database service. Based on the comparison, one of an approval or a rejection of the transaction may be transmitted (returned) to the payment network (e.g., a card processor).

In some implementations, the transaction attributes in the transaction information received from the payment network may include a pump location identifier, and analyzing the transaction information may include comparing the pump location identifier to the location data received from the user device.

At block 550, based on a previous determination that the fuel likelihood score does not meet the first threshold, it is determined whether the fuel likelihood score meets a second threshold.

If it is determined that the fuel likelihood score does not meet the first threshold and meets a second threshold, block 550 may be followed by block 555, else block 550 may be followed by block 585.

At block 555, a request for additional verification data is displayed or caused to be displayed on the application executing on the user device.

The request may be displayed or caused to be displayed on the user device and may include a request for a capture and transmission of an image of one or more of an odometer, a dashboard, or a license plate of the vehicle.

In some implementations, the request may include a request for an image of a license plate of the vehicle and/or an image of an environment surrounding the vehicle, e.g., an image of a fuel pump, other vehicles, etc.

Block 555 may be followed by block 560.

At block 560, additional verification data may be received from the user device and may include the additional verification data, e.g., image data and corresponding image metadata.

Block 560 may be followed by block 565.

At block 565, an updated fuel likelihood score for the trip is calculated based on the additional verification data and the received trip data. The additional verification data received may be utilized to generate an updated location and/or an updated fuel state for the vehicle, and to generate the updated fuel likelihood score based on the updated location and/or fuel state.

Block 565 may be followed by block 570.

At block 570, the updated fuel likelihood score is compared to the first threshold.

If it is determined that the updated fuel likelihood score meets the first threshold, block 570 may be followed by block 575, else block 570 may be followed by block 525.

At block 575, a signal/message is transmitted, e.g., via an API, or via a http/https channel, to a computer associated with a payment network, to update one or more payment attributes that are stored in a device of the payment network and wherein the one or more payment attributes are associated with the payment instrument.

Block 575 may be followed by block 580.

At block 580, a first status indicator, e.g., an indication that the payment instrument is approved for the fuel transaction may be displayed or caused to be displayed. The indication may be provided on an application executing on the user device.

Block 580 may be followed by block 525.

At block 585, a second status indicator or notification may be displayed on the user device specifying that the payment instrument is not pre-validated for a transaction. The user may be prompted to contact an issuer or manager associated with the payment instrument.

Blocks 505-585 can be performed (or repeated) in a different order than described above and/or one or more steps can be omitted.

For example, in some implementations, only a first threshold may be utilized, or only a second threshold may be utilized. For example, in some implementations, all pre-validation may require the transmission of verification data (by the user device) for reception at the payment instrument management system. In some other implementations, only automatic pre-validation may be performed, e.g., pre-validation is only performed based on automatically sensed and transmitted data, and data entered by users is not considered.

In some implementations, block 580 may be performed before block 575.

Figure 6:
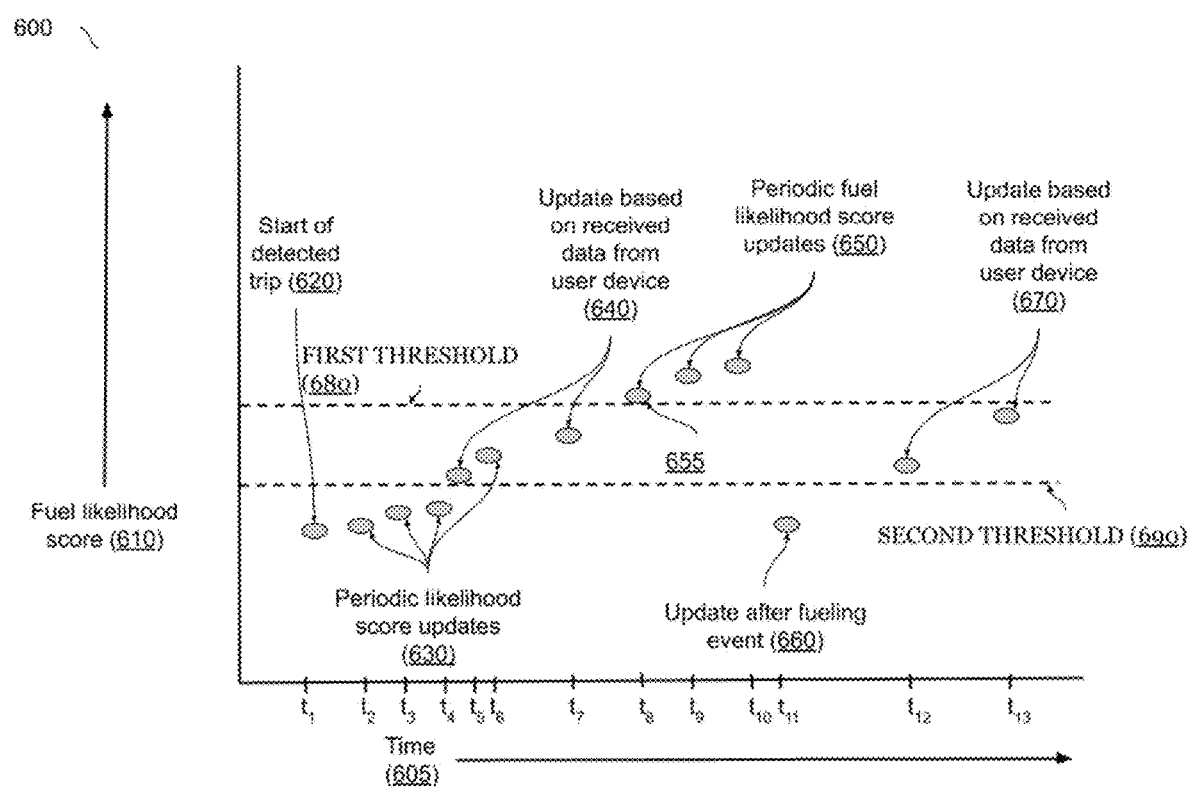
FIG. 6 depicts an example graph that illustrates a fuel likelihood score as a function of time and events, in accordance with some implementations.

FIG. 6 depicts an example graph that illustrates a fuel likelihood score as a function of time and events, in accordance with some implementations.

In this illustrative example, fuel likelihood scores calculated for an example trip are depicted on a graph 600 that includes time 605 as its X-axis, and the fuel likelihood score 610 as its Y-axis. The graph also depicts a first threshold (680) and a second threshold (690).

In some implementations, the first threshold is a configurable parameter that is indicative of a fuel likelihood score level greater than which, a fuel transaction event is determined to be a likely valid transaction, e.g., with a relatively low probability of being a fraudulent or misused transaction.

In some implementations, the second threshold is a configurable parameter that is indicative of a fuel likelihood score level below which a fuel transaction event is likely to not be a valid transaction, e.g., with a relatively high probability of being a fraudulent or misused transaction.

The first and second thresholds may be determined based on historical fuel event data, a type of vehicle, a load of the vehicle, a corresponding fuel mileage (fuel efficiency) of the vehicle, a type of terrain being driven, etc. The thresholds may be set by a fleet operator and/or by a payment instrument management system.

At a time of commencement of the trip (620), $t_1$, in this particular example, the fuel likelihood score is calculated to be a number that is relatively low. This may be based on additional data that is indicative of a previous fueling event, and trip data that includes a time and distance of travel of the vehicle since the previous fueling event.

The fuel likelihood score is updated based on periodic recalculation (630) of the fuel likelihood score based on an elapsed time and/or an estimated distance of travel, as well as be updated based on received data from a user device (640), e.g., an authenticated user device that is associated with the vehicle. For example, in this illustrative example, the calculation of fuel likelihood scores at $t_2$, $t_3$, $t_3$, and $t_6$ may be based on periodic updates (e.g., at a regular predetermined interval), while the calculation at $t_6$ and $t_7$ are based on received trip data from a user device.

The periodic updates may be configured to have a particular periodicity, which may also change (decrease) with increasing elapsed time since the commencement of the trip. The periodicity of the updates may be also be adjusted based on received trip data from a user device.

For example, the fuel likelihood score may be calculated at a first calculation periodicity at an initial portion of a trip and be calculated at a second calculation periodicity (that is smaller than the first calculation periodicity and thus more frequently) towards a latter portion of the trip.

The fuel likelihood score may also be calculated based on received updates from the user device that provide additional data on distance traversed by the vehicle during the trip.

In some implementations, a fuel likelihood score may be recalculated every time that an update is received from a user device associated with the trip. In some implementations, a minimum time may be specified for a fresh calculation of a fuel likelihood score.

FIG. 6 additionally depicts a particular fuel likelihood score (655) that is greater than the first threshold, marking a fuel likelihood score that would automatically cause a message to be transmitted for a payment attribute to be adjusted, per techniques of this disclosure. In this illustrative example, the fuel likelihood score is updated (650) subsequent to the fuel likelihood score meeting the first threshold.

In this illustrative example, FIG. 6 also depicts a fuel likelihood score (660) calculated after the vehicle was refueled during the trip (at $t_{11}$) and reflects the fact that it may be unlikely that the vehicle will need to be refueled soon after. Subsequent updates of the fuel likelihood score (670) are also depicted, calculated based on received updates from the user device.

Figure 7:
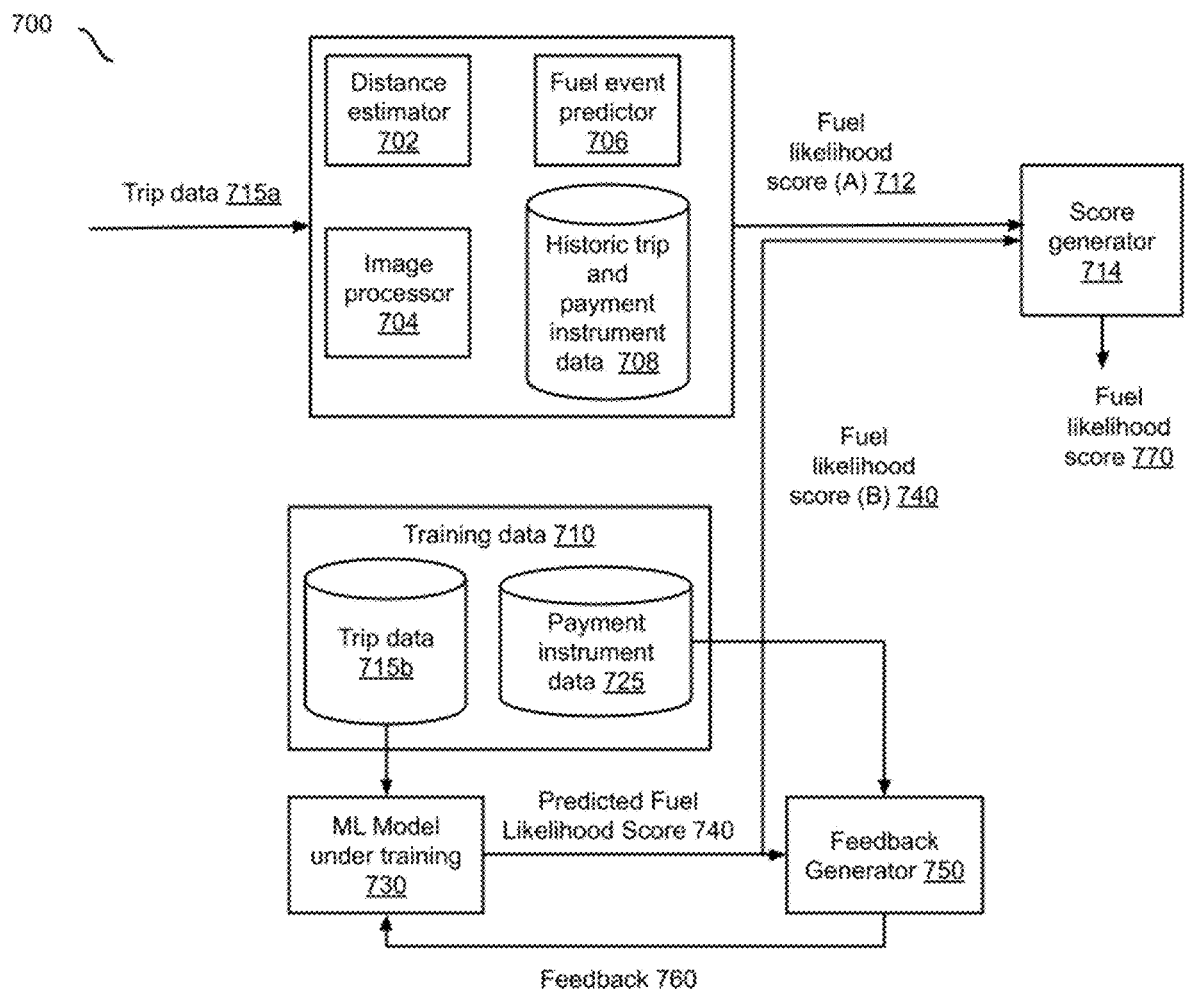
FIG. 7 is a block diagram that illustrates example fuel likelihood score calculation, in accordance with some implementations.

FIG. 7 is a block diagram that illustrates example fuel likelihood score calculation, in accordance with some implementations.

The fuel likelihood score may be calculated using a variety of techniques, e.g., deterministic techniques, Machine Learning (ML) based techniques, predictive modeling techniques, and combinations of techniques.

In this illustrative example, received trip data 715*a* is utilized at a distance estimator 702 to determine a distance traveled since a previous fuel event. An estimated distance traveled may be determined based on trip data elements, e.g., location data, route info, odometer data, etc.

The fuel consumption of the vehicle may be determined. An initial fuel state is obtained, either based on a record of an actual fuel event that is received or estimated based on historic trip and payment instrument data 708, e.g., from a fleet management system, or based on user entered data or an image.

Received image data may be processed by image processor 704, e.g., to analyze an image of an odometer or fuel gauge to extract mileage and fuel state data. A fuel event predictor 706 may be utilized to predict a future fuel event, e.g., a predicted distance and time to the next fuel event. The predictor may utilize Kalman filtering techniques, Wiener filtering techniques, etc. to predict a likely fuel event (time and distance). A fuel likelihood score (A) 712 is calculated based on the predicted fuel event based on trip data.

In some implementations, the fuel likelihood score (A) may be utilized as the fuel likelihood score to be utilized for comparison against a first and/or a second threshold, e.g., first and second thresholds described with reference to FIG. 4B, FIG. 5, or FIG. 6.

In some implementations, the fuel likelihood score (A) may be combined at a score generator 712 with a fuel likelihood score (B) 740 that is calculated based on applying the trip data to a machine learning model that has been previously trained on actual route data and fueling data from one or more fleets. A score generator 714 may be utilized to weight the respective fuel likelihood score streams to generate a fuel likelihood score 770 that may then be utilized for comparison against the first and/or second threshold.

The machine learning model can be implemented on a computer that includes one or more processors and memory with software instructions. In some implementations, the one or more processors may include one or more of a general-purpose central processing unit (CPU), a graphics processing unit (GPU), a machine-learning processor, an application-specific integrated circuit (ASIC), a field-programmable gate array (FPGA), or any other type of processor.

In this illustrative example, supervised learning is used to train a machine learning (ML) model 730 based on training data 710 and a feedback generator 750. ML model 730 may be implemented using any suitable machine learning technique, e.g., a clustering algorithm, a log likelihood algorithm, a feedforward neural network (FNN), a convolutional neural network (CNN), etc. In some implementations, other machine learning techniques such as Bayesian models, support vector machines, hidden Markov models (HMMs), etc. can also be used to implement ML model 730.

The training data 710 includes trip data 715*b* for one or more trips and corresponding payment instrument data 725. The training data may be based on historical fuel records, e.g., with details of a time(s) that a vehicle was fueled, location(s) where a vehicle was fueled, a price of fuel, and a type of fuel. The training data can include data from one or more fleets.

In this illustrative example, trip data 715 are provided to a machine learning (ML) model under training 730. The ML model generates a predicted fuel likelihood score 740 based on a current state of the ML model and the trip data, e.g., data elements such as distance traveled, type of vehicle, driver data, etc. For example, the ML model may determine a feature vector (or embedding) based on features of trip data 715. The feature vector (or embedding) may be a mathematical, multi-dimensional representation generated based on trip data 715.

ML model 730 may generate a predicted fuel likelihood score for the trip based on the trip data, e.g., based on the feature vector, and/or based on similarity with feature vectors of other trip data associated with previous trips.

The predicted fuel likelihood score 740 generated by ML model 730 is provided to feedback generator 750.

Feedback generator 750 is also provided with the ground truth payment instrument data 725 corresponding to the trip, as measured and/or reported. Feedback 760 is generated by feedback generator 750 based on a comparison of the predicted likelihood score with the ground truth payment instrument data, e.g., at what location was a vehicle refueled, what distance was covered, duration between fuel events, etc. For example, if predicted likelihood score 740 is within a predetermined threshold distance of ground truth payment instrument data 725, positive feedback may be provided as feedback 760, while if they are far apart and outside a threshold distance, negative feedback is provided to the ML model under training, which may be updated based on the received feedback using reinforcement learning techniques.

In some implementations, the ML model includes one or more neural networks. The neural network(s) may be organized into a plurality of layers including a plurality of layers. Each layer may comprise a plurality of neural network nodes. Nodes in a particular layer may be connected to nodes in an immediately previous layer and nodes in an immediately next layer. In some implementations, the ML model may be a convolutional neural network (CNN).

The training of the ML model may be performed periodically at specified intervals, or may be triggered by events. In some implementations, the training may be repeated until a threshold level of performance prediction accuracy is reached.

Figure 8:
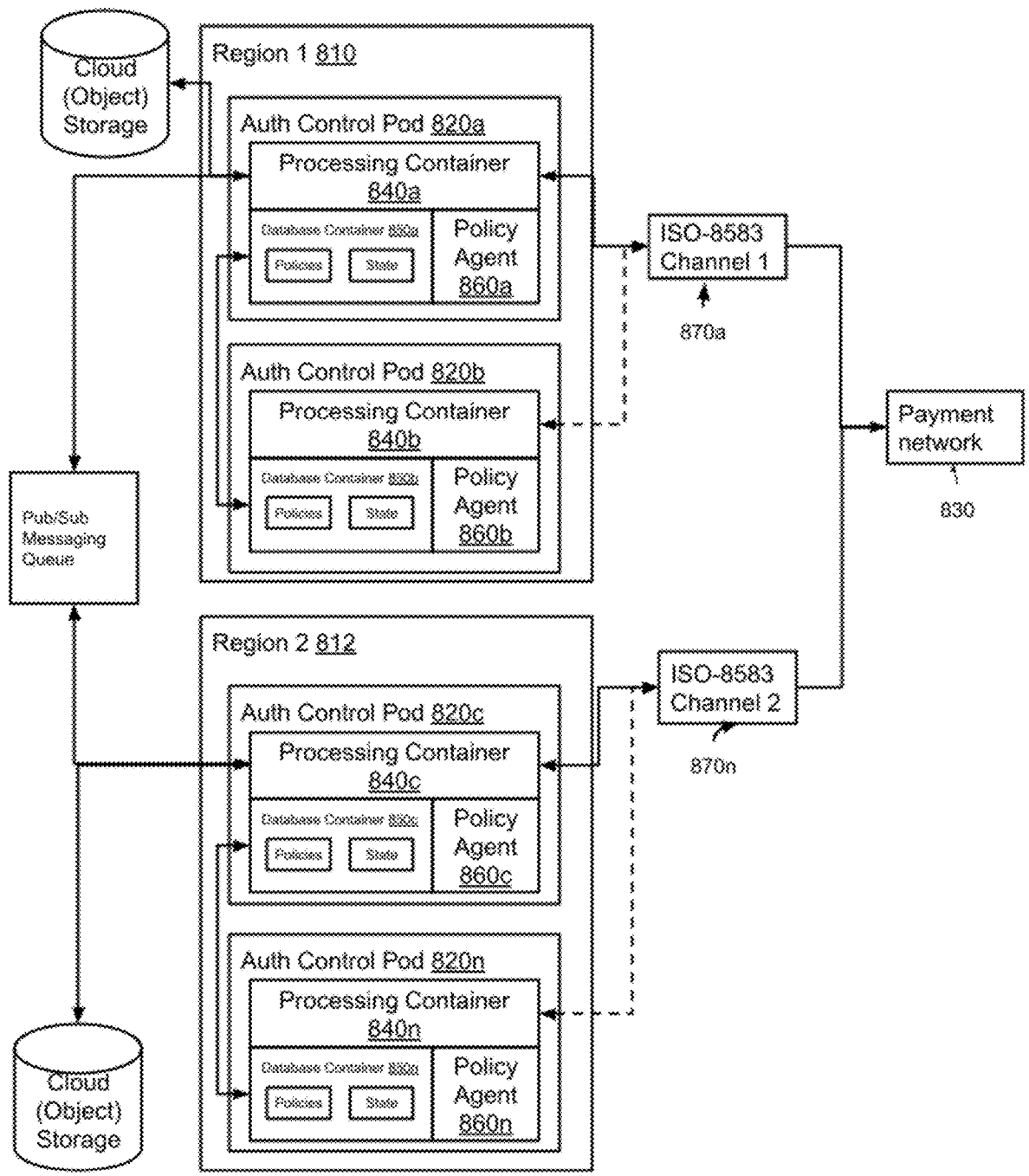
FIG. 8 is a diagram of an example system architecture to provide high availability real-time authorization of transactions, in accordance with some implementations

FIG. 8 is a diagram of an example system architecture to provide high availability real-time authorization of transactions, in accordance with some implementations The service consists of 2 independent groups of authentication control pods running in distributed computing systems, e.g., clusters that are located in distinct regions. Each pod in a group consists of the following containers:

Processing Container:
It performs the signaling with the ISO-8583 channel
Distributes incoming authorization requests to workers (threads)
It receives policy and state updates from the application scope and stores them in the database container.
Database Container:
It holds the policies associated with entities (cards, users, etc.).
It holds all states necessary for the evaluation of policies.
It performs 2-way synchronous replication to maintain up-to-date state across the authentication control pods in the same region. Real-time cross-regional database replication is not required as outlined below.
Policy Agent:
It receives a policy for evaluation.
It receives the state information required for the evaluation of the policy.
It returns an approval or rejection policy evaluation result.

All the pods in a region are configured to connect to the same ISO-8583 IP address. Only a single pod in the group can establish a valid link to the ISO-8583 channel (active pod) while the other pods remain in standby mode (standby pods). If the active pod terminates, one of the standby pods will set up a valid link to the ISO-8583 channel. The pods in a region are distributed to distinct availability zones. According to this architecture, an active pod will be available in each region.

ISO-8583 Signaling

The card processor (payment network) delivers each authorization request through all active ISO-8583 channels. Thus, both regions receive the same set of authorizations in the same order. The processing containers in each region separately evaluate the policies that apply to the incoming authorization request and post their response to the ISO-8583 channel. The card processor considers only the response that arrived first in the ISO-8583 channel and discards further responses associated with the given authorization request.

High Availability

An RDBMS is attached to each Balance enquiry pod to enable low-latency access and allow each pod to remain self-contained without dependencies to external services for the approval of incoming authorization requests. The RDBMS is set up in multi-master replication mode. This is required to avoid a downtime during the fail-over of the master to one of the slave instances. An RDBMS cluster is set up per region.

Each pod receives application entity lifecycle events (organization, user & card CRUD operations) through a message/event streaming service, e.g., a Kafka topic to which all pods are subscribed. The pods in each region are part of the same consumer group and therefore compete for the same messages. When a pod pulls a message from the Kafka topic, it updates its local RDBMS and through replication, the change is reflected to the other pod in the same region. Thus, entity lifecycle events eventually reach all pods in all regions.

As mentioned in the ISO-8583 signaling section, each authorization is delivered through both ISO-8583 channels. The authorization in each region is received by the main ISO-8583 channel read/write thread and processed as follows:

1. The authorization is committed to the local RDBMS with state set to PENDING. This is to ensure that the associated amount is reserved before the next authorization is processed.

2. The authorization is assigned to a worker system for further processing.

3. The worker system evaluates the policies relevant to the authorization.

4. The worker system stores the result of the evaluation in the RDBMS and returns the result to the main ISO-8583 channel thread.

5. The main thread writes the result to the ISO-8583 channel.

6. The worker thread writes the authorization and the evaluation result to a Pub/Sub topic. The Pub/Sub service is a multi-regional low-latency reliable messaging service. The messages in this topic are used by pods in both regions to detect any authorizations that may have been missed and to synchronize their locally maintained list of authorizations.

7. The worker thread writes the authorization and the evaluation result to GCS object storage. This storage is used as backup storage for messages published to Pub/Sub and allows recovering these messages in case of a catastrophic failure in the region hosting the Pub/Sub messages of the corresponding pod. This is also a last-resort repository of processed authorizations in case of other failures that involve pods in both regions.

This layout is able to tolerate both zonal and regional failures without suffering any message loss.

Recovery

When a previously offline set of pods in a region is activated, it first catches up with the backlog of missed authorizations through Pub/Sub messaging. The active pod in the recovering region must observe messages coming both from Pub/Sub and the ISO-8583 channel until both are in-sync to ensure that it does not start evaluating new authorizations from the ISO-8583 channel until all previous authorizations have been received through Pub/Sub.

The recovering pod performs the following:

1. Pull messages from the Pub/Sub topic and store the RDBMS.

2. Pull messages from the ISO-8583 channel and store them to RDBMS with status PENDING.

3. When a message that was received from Pub/Sub is already present in the RDBMS with status PENDING (i.e. received through the ISO-8583 channel), the recovering pod is certain that it has received and stored all messages in the RDBMS and that the current balance is up-to-date. The pod can then resume to normal operation where it evaluates new messages from the ISO-8583 channel and provides responses.

Figure 9A:
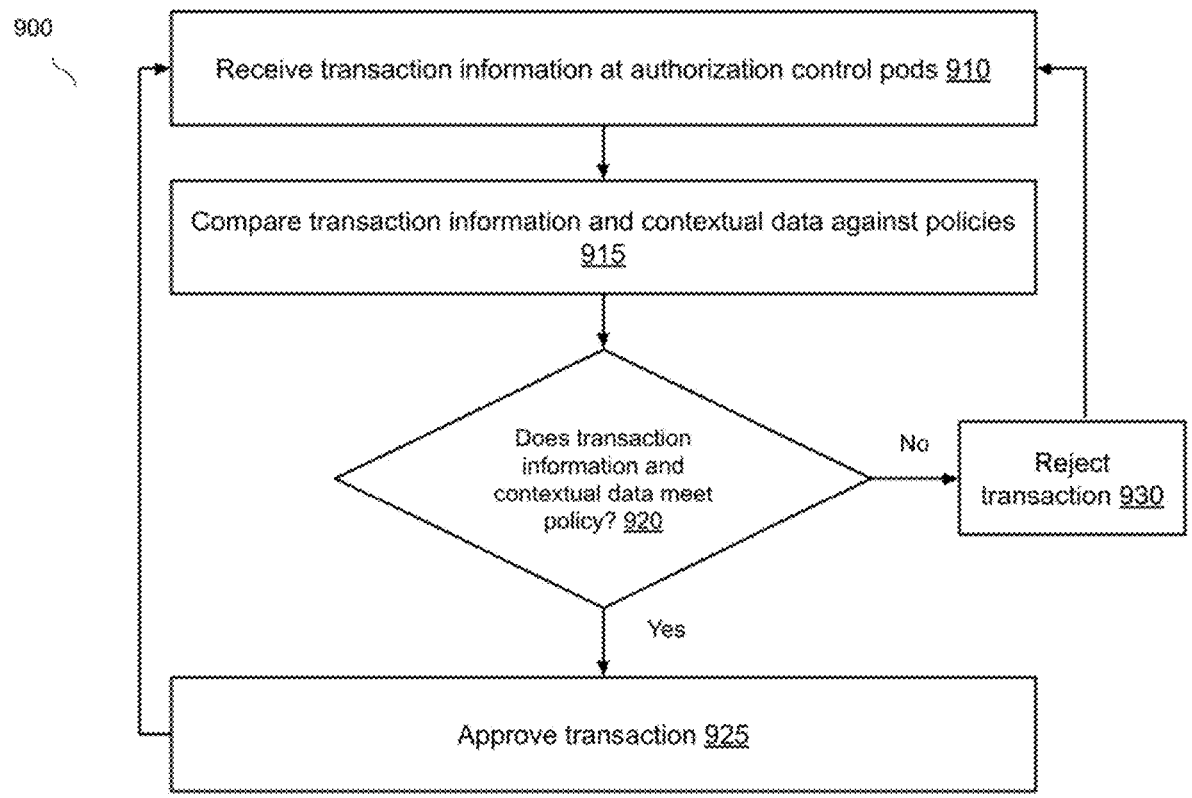
FIG. 9A is an example method for high availability real-time authorization of transactions at an authorization control pod, in accordance with some implementations.

FIG. 9A is an example method for high availability real-time authorization of transactions at an authorization control pod, in accordance with some implementations.

In some implementations, method 900 can be implemented, for example, on processing system 110 described with reference to FIG. 1. In the described examples, the implementing system includes one or more digital processors or processing circuitry ("processors"), and one or more storage devices. In some implementations, different components of one or more servers and/or clients can perform different blocks or other parts of the method 900. In some examples, a first device is described as performing blocks of method 900. Some implementations can have one or more blocks of method 900 performed by one or more other devices (e.g., other client devices or server devices) that can send results or data to the first device.

In some implementations, the method 900, or portions of the method, can be initiated automatically by a system. In some implementations, the implementing system is a first device. For example, the method (or portions thereof) can be periodically performed, or performed based on one or more particular events or conditions, e.g., reception of a fresh transaction, a signal received from a card/payment processor, and/or one or more other conditions occurring which can be specified in settings read by the method.

Processing may begin at block 910.

At block 910, transaction information is received at one or more authorization control pods. Block 910 may be followed by block 915.

At block 915, the received transaction information may be compared against one or more policies. Block 915 may be followed by block 920.

At block 920, it is determined whether the transaction information and contextual data meet the one or more policies. If it is determined at block 920 that the transaction information and contextual data meet (e.g., are in compliance with) the one or more policies, block 920 may be followed by block 925, else block 920 may be followed by block 930.

At block 925, the transaction is approved.

At block 930, the transaction is rejected.

Figure 9B:
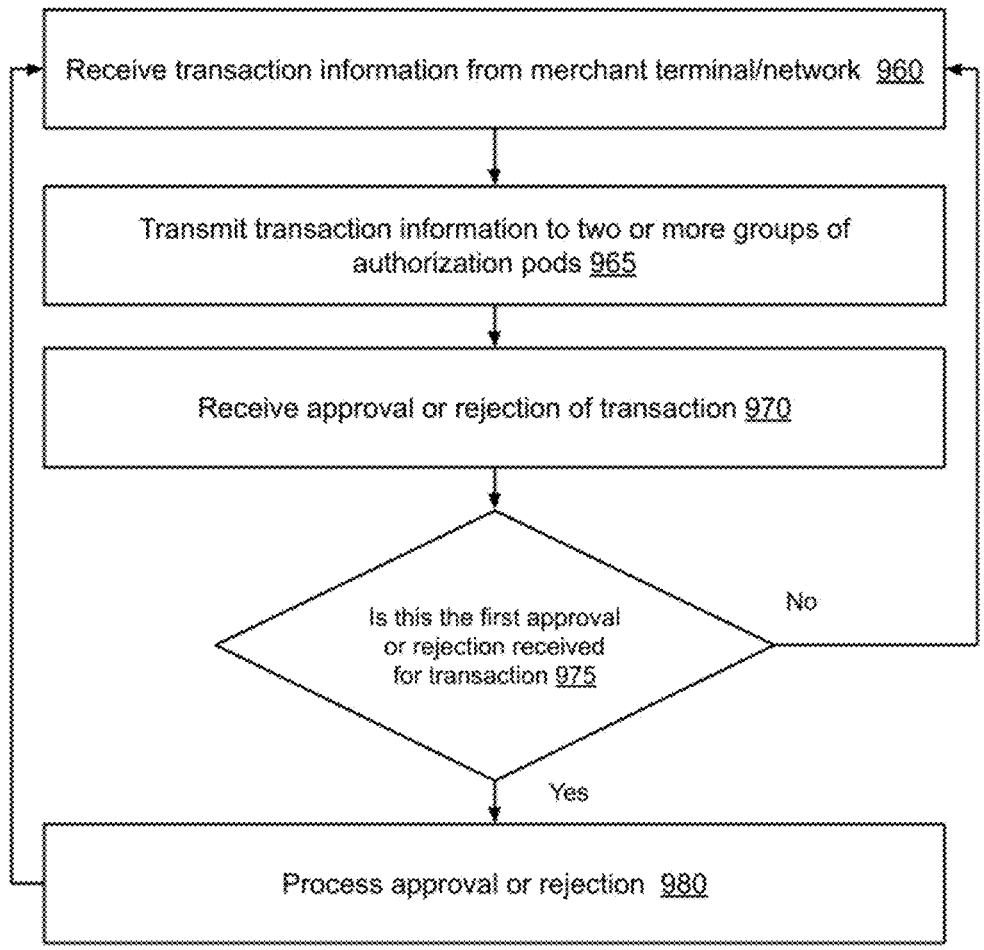
FIG. 9B is an example method of high availability real-time authorization of transactions at a payment network (card processor), in accordance with some implementations.

FIG. 9B is an example method of high availability real-time authorization of transactions at a payment network (card processor), in accordance with some implementations.

In some implementations, the method 950, or portions of the method, can be initiated automatically by a system. In some implementations, the implementing system is a first device. For example, the method (or portions thereof) can be periodically performed, or performed based on one or more particular events or conditions, e.g., notification of a transaction from a merchant terminal, and/or one or more other conditions occurring which can be specified in settings read by the method.

Processing may begin at block 960.

At block 960, transaction information is received at a payment network (card processor) from a merchant terminal or payment network. Block 960 may be followed by block 965.

At block 965, the transaction information to two or more groups of authorization pods. Block 965 may be followed by block 970. At block 970, an approval or rejection may be received from the one or more groups of authorization pods. Block 970 may be followed by block 975.

At block 975, it is determined whether the received approval or rejection is the first received for the transaction. If it is determined that the received approval or rejection is the first rejection, then the approval or rejection is processed at block 980, else block 975 may be followed by block 960.

Figure 10A:
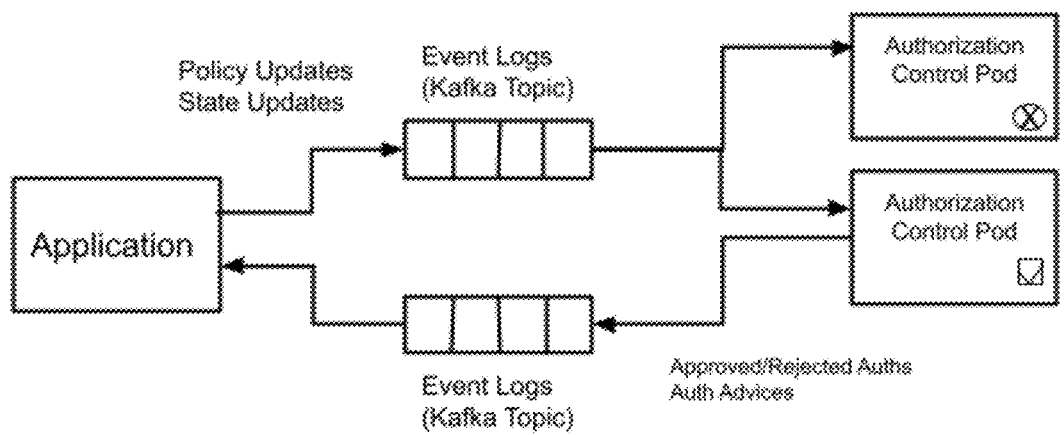
FIG. 10A illustrates an example of communication of state and policy updates, in accordance with some implementations.

FIG. 10A illustrates an example of communication of state and policy updates, in accordance with some implementations.

The application scope communicates updates to the Authorization Control pods through messaging. Updates include state updates (e.g., addition of cards, budget updates, whitelisted/blacklisted MCCs, etc.) or policy updates (e.g., a MCC-based approval policy, per-diem spending policy, etc.).

Both Authorization Control pods receive policy & state updates and they apply these to their local databases and upload the new policies to the policy agent.

The active Authorization Control pod sends all incoming authorizations to the application scope through messaging. In case of authorization requests, the result of the policy evaluation is also sent.

In case of authorization rejection, in addition to the evaluation result, the specific policy that resulted in the rejection is included in the message to the application scope.

Application Scope Data Model

Policies

Application scope policies are parameterized, and parameters are configurable by the customer. A set of policy templates are set up in the system. A policy template consists of a template of the policy script and a set of default values for the optional template parameters. Policy instances contain a set of policy template attributes and a reference to the underlying policy template. The combination of a policy template and a policy instance (i.e. the set of instantiation parameters) can be used to generate the target policy script.

A policy instance is associated with a single entity: a single card, a single user or a single organization/division. The associated entity UID, the entity type (card, user, user-group) and the generated policy script are sent to the Balance enquiry service through a message queue.

Entity Updates

The following operations are communicated to the Balance enquiry service through a message queue:

Card creation, deletion and any other card update that affects the card's operational status (blocking, lost/stolen, etc.): The creation operation triggers the creation of a Card entity in the Balance enquiry service with an externand=card.uid.

User creation & deletion: The creation operation triggers the creation of User entity in the Balance enquiry service with an externalId=user.uid. In addition, a User-Group entity is created in the Balance enquiry service with externand=user.org.uid. A user deletion operation removes the user from the corresponding UserGroup.

Balance Enquiry Data Model

Policies

Policies can be attached to entities. The entities can be individual cards, individual users or groups of entities. Policies can be added, updated or deleted. Policies are enabled by default and they cannot be disabled except when they expire or when they are deleted. Policies may optionally have an effective date and/or an expiration date denoting the period during which the policy will be considered. Policies are self-contained and their evaluation does not produce any side effects (e.g., state changes). Multiple policies can be attached to users, cards and groups. Multiple policies can be attached to an entity. Since policies are self-contained and they do not produce side effects, multiple policies for an entity can be evaluated in parallel.

Figure 10B:
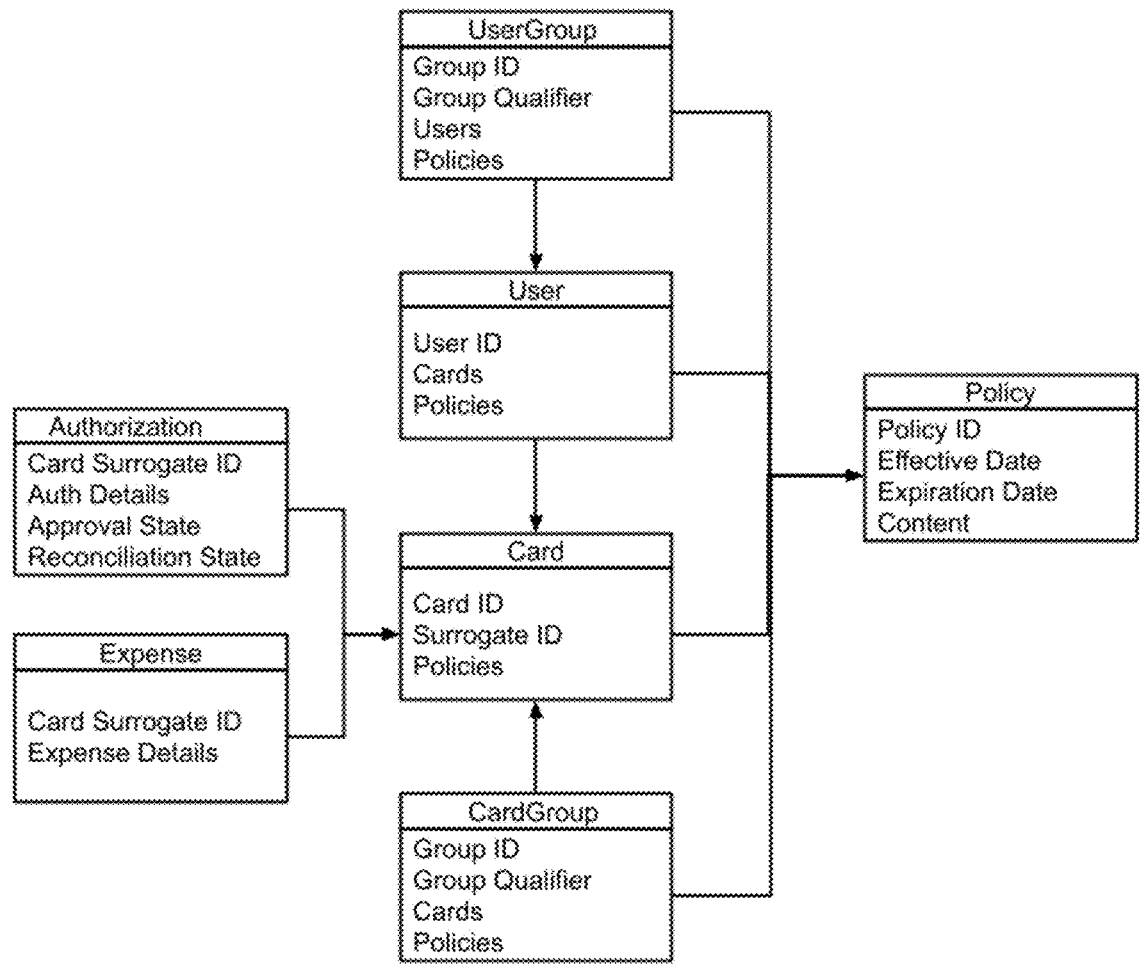
FIG. 10B is a diagram that depicts an example domain model, in accordance with some implementations.

FIG. 10B is a diagram that depicts an example domain model, in accordance with some implementations.

The monitored state depends exclusively on the input required by the evaluation of the policies.

In an example domain model, individual cards, users and groups of cards and users can be associated with one or more policies. Card grouping allows subsets of an individual user to be associated with a distinct set of policies. Similarly, organizations, divisions and departments can all be modeled as groups of users. In addition, any incoming authorization request is stored in the database of each service pod and used to evaluate policies that require historic data (e.g., budget, per-diem, spend velocity).

A policy document contains the policy script and optionally an effective date and an expiration date. The policy script is generated at the application scope and embeds small data that does not change frequently (e.g., MCC ranges).

The following tables include the attribute name and description for User Groups, User, CardGroup, Card, and Policy.

| Attribute Name | Attribute Description |
| --- | --- |
| Group ID | The external ID points to the application scope entity UID (e.g., an organization UID). |
| Group Qualifier | This is used to disambiguate between different user grouping approaches in the application scope (organization, department, etc.) and map to a common concept of user group in the Balance enquiry service. |
| Users | Members of the group |
| Policies | Policies attached to the group |

| Attribute Name | Attribute Description |
| --- | --- |
| User ID | The external ID pointing to the application scope user UID. |
| Cards | List of cards owned by the user |
| Policies | Policies attached to the user |

| Attribute Name | Attribute Description |
| --- | --- |
| Group ID | The external ID pointing to the application scope entity UID. Currently there's no corresponding application scope card grouping. |
| Group Qualifier | Provisional attributes to distinguish between different grouping entities in the application scope and map to a common group in the Balance enquiry service. |
| Cards | Member cards of the group |
| Policies | Policies attached to the group |

| Attribute Name | Attribute Description |
| --- | --- |
| Card ID | The external ID pointing to the application scope card UID. |
| Surrogate ID | Card processor-specific token associated with the card. There's a one-to-one mapping between the surrogate ID and the PAN and the card processor provides a mapping function for converting PAN → Surrogate ID and Surrogate ID → PAN. |
| Policies | Policies attached to the card. |

| Attribute Name | Attribute Description |
| --- | --- |
| Policy ID | The external ID pointing to the application scope policy instance UID. This is included in the response to application scope upon the approval or rejection of the authorization request. |
| Effective Date | Consider policy only after effective date |
| Expiration Date | Consider policy only before expiration date |
| Content | The policy script to evaluate |

Authorizations

Received authorizations are immediately stored in the RDBMS with status PENDING, to reflect the available balance while the authorization is evaluated and potentially subsequent authorizations for the same account are being processed in parallel.

Expenses

When the settlement report is processed and authorizations are reconciled with settlements, a message is sent to Balance enquiry with an Expense object that contains the final settled amount, all associated authorizations details. The authorizations associated with the expense are marked reconciled and they are not considered in policy evaluation criteria. Instead the corresponding settled expense object is considered when evaluating policies.

Refunds are handled as expenses with a negative amount value. Non-business expenses on a business card are flagged into the expense object and they are not considered during policy evaluation unless the policy dictates this explicitly. Business expenses on a personal card are added to Balance enquiry as expense objects without associated authorizations. These (manual) expenses may lack critical attributes that are present in auto expenses (e.g., MCC details).

Account Balance

Account balances are implemented as policies attached to UserGroup entities. The UserGroup contains the Users that have Cards backed by the corresponding bank account. In the unlikely scenario of Cards of a User backed by different bank accounts, a corresponding CardGroup per bank account needs to be maintained and the policy is attached to the CardGroup.

Figure 11:
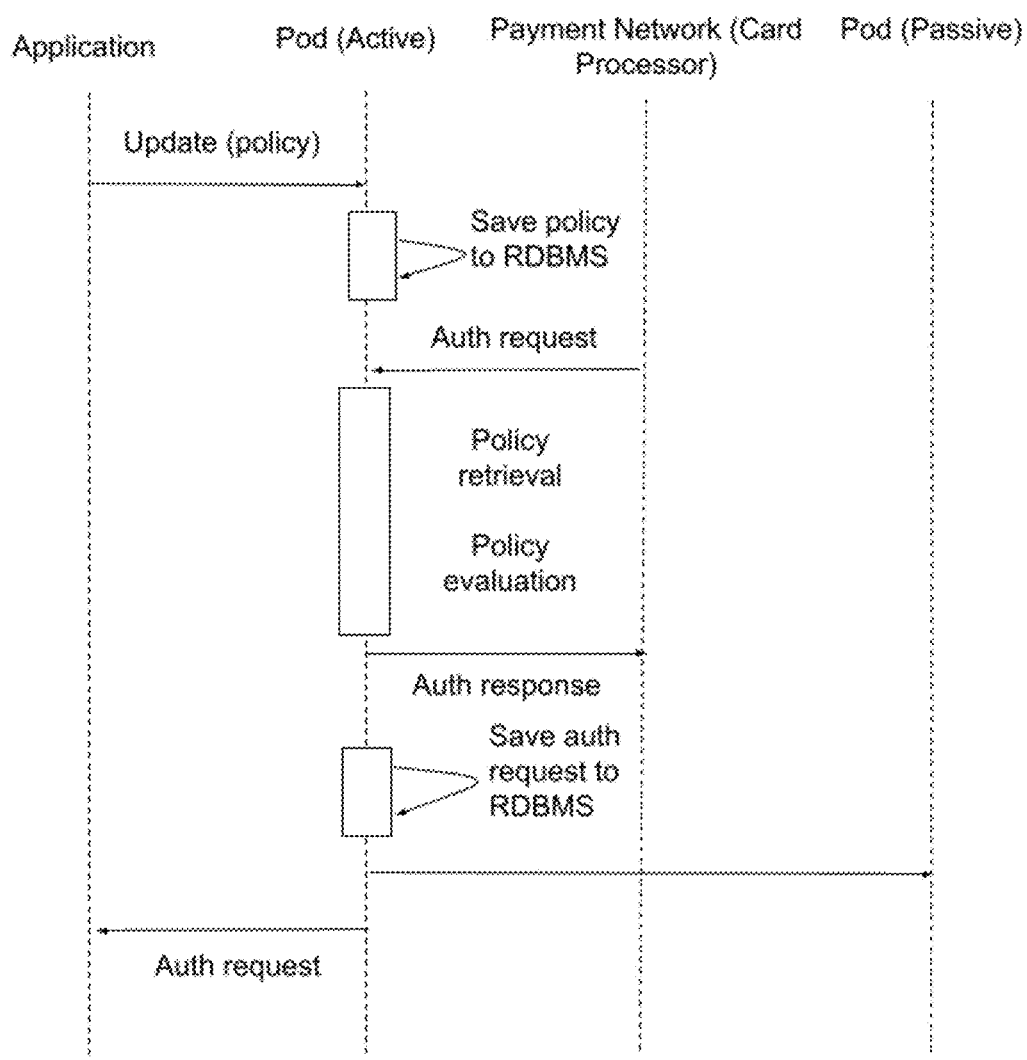
FIG. 11 depicts an example workflow for policy evaluation, in accordance with some implementations.

FIG. 11 depicts an example workflow for policy evaluation, in accordance with some implementations.

Policy Evaluation

The evaluation of a policy is performed by coupling the policy script with input data. The data is provided in the following ways:

It can be embedded into the policy script. This is suitable for non-dynamic data that have a relatively small size.

It can be provided as input at the time of evaluation. This is suitable for dynamic data that have to be provided explicitly on each occurrence of the policy evaluation.

It can be pulled by the policy script during evaluation. This is suitable for static or dynamic data that have a large size.

In addition, the incoming authorization request is always provided as input to the policy. The authorization request is sanitized, that is, PCI-scope data is either removed or tokenized before the request is provided to the policy evaluation engine. Specifically, all occurrences of the PAN are converted to the corresponding surrogate ID.

The active pod that receives the authorization request must perform the following steps:

1. Retrieve all policies that apply directly or indirectly to the incoming auth request. These include:

1. Policies directly associated with the card referenced in the auth request.

2. Policies associated with groups that the referenced card is a member of.

3. Policies associated with the cardholder (user) of the referenced card.

4. Policies associated with groups that the cardholder is a member of.

2. Evaluate the retrieved policies providing the incoming auth request as input to the policies. Policies can be evaluated sequentially or in parallel. The process terminates when one of the policies rejects the auth request.

3. The pod sends the result of the evaluation through the ISO-8583 link. The pod monitors steps 1 to 3. If the cumulative time for steps 1 to 3 exceeds a predetermined threshold, e.g., 4.5 seconds, the process is terminated and the pod returns a rejection message to the ISO-8583 link.

4. The pod saves the auth request and the result of the evaluation to the local RDBMS. The data is replicated to the failover pod.

5. The pod sends the auth request and the result of the evaluation to the app scope through a messaging/event log service, e.g., Kafka.

The result of the evaluation that is sent to the application scope includes the following attributes:

| Attribute Name | Attribute Description |
| --- | --- |
| Authorization Result | The sanitized authorization request The result of the evaluation. One of approval decline error timeout |
| Approved Policies | In case of approval, the list of approved policies will be non-empty. |
| Declined Policies | In case of decline, the list of declined policies will be non-empty. The list of approved policies will be non-empty if more than one policies have been evaluated. For example, if policies A, B, & C are evaluated and A & B allowed the authorization but C rejected it. Then declined = [C] and approved = [A, B]. Given that a decline leads to immediate termination of the evaluation, the declined policies set will have at most a single element. |
| Error Code Error Message | In case of error, an error code and optional error message will be included. |

Figure 12:
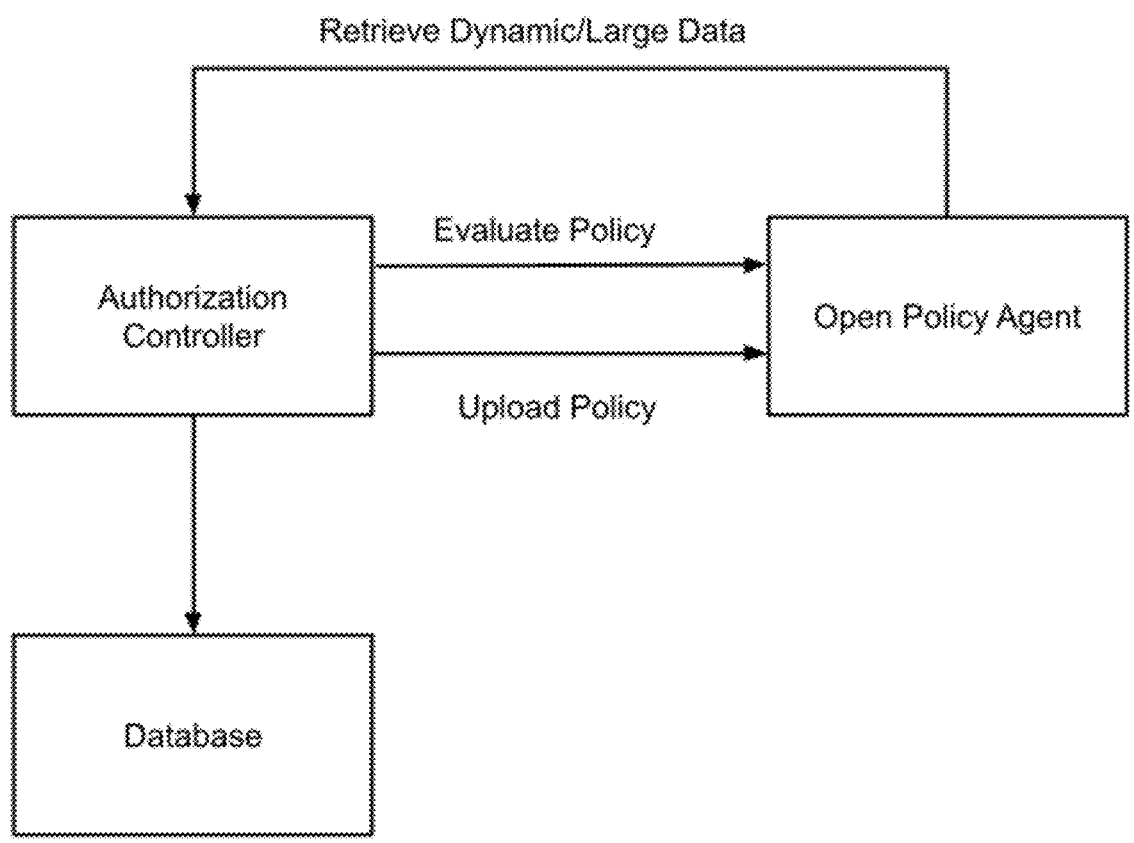
FIG. 12 illustrates an example evaluation of a policy by a policy engine, in accordance with some implementations.

FIG. 12 illustrates an example evaluation of a policy by a policy engine, in accordance with some implementations.

The policy script is uploaded to OPA through OPA's management REST API call. Then the policy can be evaluated through the data REST API.

Besides the data that is embedded into the policy script, additional data is provided from the input at policy evaluation time and through HTTP invocations from within the policy script. HTTP invocations are made back into the Authorization Controller which provides a local (pod-internal) REST API to the OPA container in the pod. The API includes calls related to dynamic data that either have a large size or require non-trivial aggregations. For example, a policy that enforces per-MCC budgets will initiate a call into the Authorization Controller to retrieve an up-to-date map of the per-MCC spending for the period specified in the policy.

A sample policy script is utilized to call a REST endpoint to retrieve the current per-MCC spending which is then compared against the per-MCC budgets.

Figure 13:
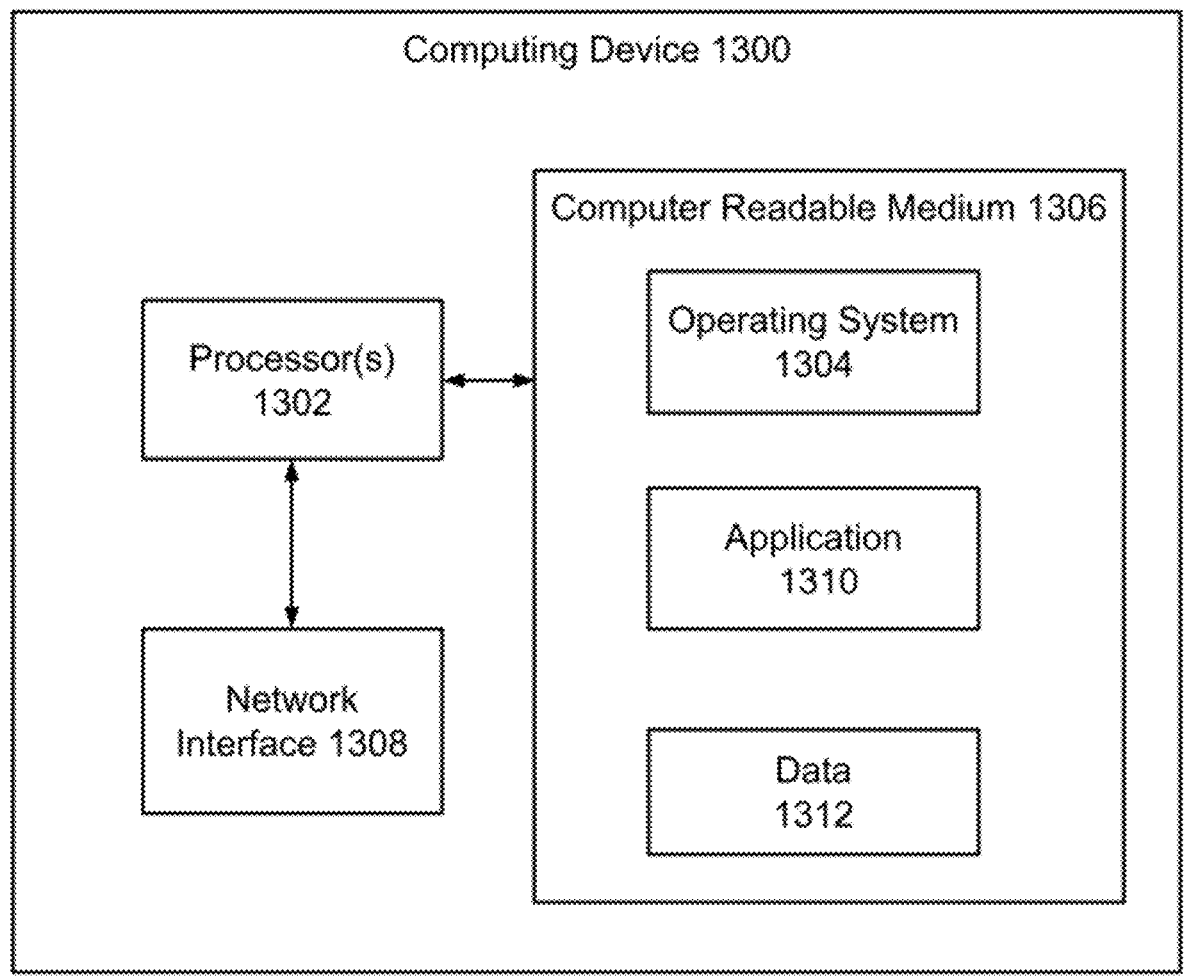
FIG. 13 is a block diagram illustrating an example computing device, in accordance with some implementations.

FIG. 13 is a block diagram of an example computing device 1300 which may be used to implement any of the features described herein. In one example, device 1300 may be used to implement a computer device (e.g., 110, 120, 130, 140, and/or 150 of FIG. 1), and perform appropriate method implementations described herein. Computing device 1300 can be any suitable computer system, server, or other electronic or hardware device. For example, the computing device 1300 can be an instance in a cloud computing or other distributed computing system, a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 1300 includes a processor 1302, a memory 1304, input/output (I/O) interface 1306, and audio/video input/output devices 1314.

Processor 1302 can be one or more processors and/or processing circuits to execute program code and control basic operations of the device 1300. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Computer readable medium (memory) 1306 is typically provided in device 1300 for access by the processor 1302, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1302 and/or integrated therewith. Memory 1304 can store software operating on the server device 1300 by the processor 1302, including an operating system 1304, one or more applications 1310 and application data 1312. In some implementations, application 1310 can include instructions that enable processor 1302 to perform the functions (or control the functions of) described herein, e.g., some or all of the methods described with respect to FIG. 4A, FIG. 4B, FIG. 5, FIG. 9A, or FIG. 9B.

Elements of software in memory 1306 can alternatively be stored on any other suitable storage location or computer-readable medium. In addition, memory 1306 (and/or other connected storage device(s)) can store instructions and data used in the features described herein. Memory 1306 and any other type of storage (magnetic disk, optical disk, magnetic tape, or other tangible media) can be considered "storage" or "storage devices."

An I/O interface can provide functions to enable interfacing the server device 1300 with other systems and devices. For example, network communication devices, storage devices (e.g., memory and/or data stores), and input/output devices can communicate via the interface. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 13 shows one block for each of processor 1302, memory 1306. These blocks may represent one or more processors or processing circuitries, operating systems, memories, I/O interfaces, applications, and/or software engines. In other implementations, device 1300 may not have all of the components shown and/or may have other elements including other types of elements instead of, or in addition to, those shown herein. While the processing system is described as performing operations as described in some implementations herein, any suitable component or combination of components of processing systems, or any suitable processor or processors associated with such a system, may perform the operations described.

A user device can also implement and/or be used with features described herein. Example user devices can be computer devices including some similar components as the device 1300, e.g., processor(s) 1302, memory 1306, etc. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices, for example, can be connected to (or included in) the device 1300 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 400, 450, 500, 900, and/or 950) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time. The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any computer-readable storage and/or transmission medium that participates in providing instructions to a processor for execution. Such a computer-readable medium can be tangible, non-transitory, and non-transient and take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

A "computer readable storage medium" may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A "computer readable signal medium" may be any computer readable medium that is not a computer readable storage medium and that can communicate, propagate, or transport a program for use by or in connection with an instruction execution system, apparatus, or device. A computer readable signal medium may convey a propagated data signal with computer readable program code embodied therein, for example, in baseband or as part of a carrier wave. Such a propagated signal may take any of a variety of forms, including, but not limited to, electro-magnetic, optical, or any suitable combination thereof. Program code embodied on a computer readable signal medium may be transmitted using any appropriate medium, including but not limited to wireless, wireline, optical fiber cable, RF, etc., or any suitable combination of the foregoing.

What is claimed is:

1. A method to update a payment attribute of a payment instrument associated with a vehicle of a fleet that includes a plurality of vehicles, the method comprising:

receiving, at a computing device, route data for a plurality of trips, wherein the route data for each trip of the plurality of trips includes a corresponding geofence region, a corresponding user identifier, a corresponding payment instrument identifier, and a corresponding vehicle identifier for each trip;

receiving, from a user device, a transmission of one or more data packets generated at a software application executing on the user device, wherein the one or more data packets comprise a user identifier and a vehicle identifier;

authenticating, by the computing device, the vehicle identifier and the user identifier;

identifying a first trip of the plurality of trips based on a match of the user identifier and the vehicle identifier with the route data, wherein the first trip is associated with a first payment instrument;

receiving, at the computing device, first trip data for the first trip from the user device, wherein the first trip data includes at least location data of the user device;

calculating, based on the received first trip data, a fuel likelihood score for the first trip, wherein the fuel likelihood score is indicative of a degree of validity of a fuel transaction;

comparing the fuel likelihood score to a first threshold;

based on a determination that the fuel likelihood score meets the first threshold:
transmitting, to a computer associated with a payment network, a message to update one or more payment attributes stored at the payment network and associated with the first payment instrument; and
displaying or causing a display, on the application executing on the user device, an indication that the first payment instrument is approved for the fuel transaction; and based on a determination that the fuel likelihood score does not meet the first threshold and meets a second threshold:
displaying or causing a display, on the application executing on the user device, a request for additional verification data;
receiving, from the user device, the additional verification data;
calculating, based on the additional verification data and the received first trip data, an updated fuel likelihood score for the first trip;
comparing the updated fuel likelihood score to the first threshold; and based on a determination that the updated fuel likelihood score meets the first threshold:
transmitting, to a computer associated with a payment network, a message to update one or more payment attributes stored at the payment network and associated with the first payment instrument;
displaying or causing a display, on the application executing on the user device, an indication that the first payment instrument is approved for the fuel transaction;
receiving at two or more groups of authorization control pods that are connected to the payment network via an ISO-8583 channel, an authorization request from the payment network for the fuel transaction, wherein the authorization request includes an identifier associated with the first payment instrument and transaction information about the transaction, and wherein each authorization control pod includes a processing service, a database service, and a policy agent;
analyzing, at a corresponding policy agent of a single authorization control pod of the groups of authorization control pods, the transaction information by comparing one or more transaction attributes in the transaction information combined with contextual and historic data against one or more policies stored in the database service; and
based on the comparison, transmitting one of an approval or a rejection of the transaction to the payment network.

2. The method of claim 1, wherein calculating the fuel likelihood score for the first trip comprises providing the first trip data to a trained machine learning model.

3. The method of claim 1, further comprising:
receiving telemetric data from a transponder attached to a vehicle associated with the vehicle identifier, wherein the fuel likelihood score is calculated based on the first trip data and the received telemetric data; and
storing, at the computing device, the first trip data and the received telemetric data in a linked data structure.

4. The method of claim 1, wherein receiving the first trip data comprises receiving a plurality of packets transmitted from the software application at a first periodicity that is based on one or more of: a time elapsed since an estimated time of commencement of the trip and a distance elapsed since the commencement of the trip.

5. A method to update a payment attribute of a payment instrument, the method comprising:
receiving, by a computing device comprising a processor and memory, an indication of a trip being undertaken by a vehicle;
associating with the trip, by the computing device, a user device, a user identifier, and a vehicle identifier;
receiving, by the computer device, from an application executing on a user device of a user of the vehicle, trip data that includes at least location data obtained from the user device;

calculating, based on the received trip data, a fuel likelihood score for the trip, wherein the fuel likelihood score is indicative of a degree of validity of a fuel transaction;
comparing the fuel likelihood score to a first threshold; and
based on a determination that the fuel likelihood score meets the first threshold:
transmitting, to a computer associated with a payment network, a message to update one or more payment attributes that are stored in a device of the payment network and wherein the one or more payment attributes are associated with a payment instrument;
displaying, on the application executing on the user device, an indication that the payment instrument is approved for the fuel transaction;
receiving at two or more groups of authorization control pods that are connected to the payment network via an ISO-8583 channel, an authorization request from the payment network for the fuel transaction, wherein the authorization request includes an identifier associated with the payment instrument and transaction information about the transaction, and wherein each authorization control pod includes a processing service, a database service, and a policy agent;
analyzing, at a corresponding policy agent of a single authorization control pod of the groups of authorization control pods, the transaction information by comparing one or more transaction attributes in the transaction information combined with contextual and historic data against one or more policies stored in the database service; and
based on the comparison, transmitting one of an approval or a rejection of the transaction to the payment network.

6. The method of claim 5, further comprising based on a determination that the fuel likelihood score does not meet the first threshold and meets a second threshold:
displaying or causing a display, on the application executing on the user device, a request for additional verification data;
receiving, from the user device, the additional verification data;
calculating, based on the additional verification data and the received trip data, an updated fuel likelihood score for the trip;
comparing the updated fuel likelihood score to the first threshold; and
based on a determination that the fuel likelihood score meets the first threshold:
transmitting, to a computer associated with a payment network, a message to update one or more payment attributes that are stored in a device of the payment network and wherein the one or more payment attributes are associated with the payment instrument; and
displaying or causing a display, on the application executing on the user device, an indication that the payment instrument is approved for the fuel transaction.

7. The method of claim 6, wherein displaying or causing a display of the request for additional verification data comprises displaying or causing the display of a request for an image of one or more of: an odometer, a dashboard, or a license plate of the vehicle, and wherein receiving the additional verification data comprises receiving image data and corresponding image metadata.

8. The method of claim 7, wherein calculating the fuel likelihood score comprises analyzing the received image data and the received image metadata to determine one or more of an odometer mileage and an estimated fuel level.

9. The method of claim 8, wherein analyzing the received image data and the received image metadata comprises determining a distance traveled since a previous fueling event.

10. The method of claim 5, further comprising receiving telemetric data from a transponder associated with the vehicle, wherein the telemetric data comprises two or more of: location data, fuel level data, and fuel efficiency data.

11. The method of claim 5, wherein calculating the fuel likelihood score comprises applying a trained machine learning (ML) model to the trip data.

12. The method of claim 11, wherein applying the trained ML model comprises:
providing trip data to the trained ML model to determine a first fuel likelihood score;
providing trip data to a fuel event predictor to determine a second fuel likelihood score; and
combining the first fuel likelihood score and second fuel likelihood score to calculate a combined fuel likelihood score.

13. The method of claim 5, wherein the transaction attributes in the transaction information received from the payment network includes a pump location identifier, and wherein analyzing the transaction information comprises comparing the pump location identifier to the location data received from the user device.

14. The method of claim 5, wherein receiving the trip data comprises receiving a plurality of packets transmitted from the application at a first periodicity that is based on one or more of: a time elapsed since an estimated time of commencement of the trip and a distance elapsed since the commencement of the trip.

15. A non-transitory computer-readable medium comprising instructions that, responsive to execution by a processing device, causes the processing device to perform operations comprising:
receiving, by a computing device comprising a processor and memory, an indication of a trip being undertaken by a vehicle;
associating with the trip, by the computing device, a user device, a user identifier, and a vehicle identifier;
receiving, by the computer device, from an application executing on a user device of a user of the vehicle, trip data that includes at least location data obtained from the user device;
calculating, based on the received trip data, a fuel likelihood score for the trip, wherein the fuel likelihood score is indicative of a degree of validity of a fuel transaction;
comparing the fuel likelihood score to a first threshold; and
based on a determination that the fuel likelihood score meets the first threshold:
transmitting, to a computer associated with a payment network, a message to update one or more payment attributes that are stored in a device of the payment network and wherein the one or more payment attributes are associated with a payment instrument;

displaying, on the application executing on the user device, an indication that the payment instrument is approved for the fuel transaction;

receiving at two or more groups of authorization control pods that are connected to the payment network via an ISO-8583 channel, an authorization request from the payment network for the fuel transaction, wherein the authorization request includes an identifier associated with the first payment instrument and transaction information about the transaction, and wherein each authorization control pod includes a processing service, a database service, and a policy agent;

analyzing, at a corresponding policy agent of a single authorization control pod of the groups of authorization control pods, the transaction information by comparing one or more transaction attributes in the transaction information combined with contextual and historic data against one or more policies stored in the database service; and based on the comparison, transmitting one of an approval or a rejection of the transaction to the payment network.

16. The non-transitory computer-readable medium of claim 15, wherein the operations further comprise:

based on a determination that the fuel likelihood score does not meet the first threshold and meets a second threshold:

displaying or causing a display, on the application executing on the user device, a request for additional verification data;

receiving, from the user device, the additional verification data;

calculating, based on the additional verification data and the received trip data, an updated fuel likelihood score for the trip;

comparing the updated fuel likelihood score to the first threshold; and based on a determination that the fuel likelihood score meets the first threshold:

transmitting, to a computer associated with a payment network, a message to update one or more payment attributes that are stored in a device of the payment network and wherein the one or more payment attributes are associated with the payment instrument; and displaying or causing a display, on the application executing on the user device, an indication that the payment instrument is approved for the fuel transaction.

17. The non-transitory computer-readable medium of claim 16, wherein displaying or causing a display of the request for additional verification data comprises displaying or causing the display of a request for an image of one or more of: an odometer, a dashboard, or a license plate of the vehicle, and wherein receiving the additional verification data comprises receiving image data and corresponding image metadata.

18. The method of claim 5, wherein transmitting one of the approval or the rejection of the transaction to the payment network comprises transmitting two or more responses to the payment network via the ISO-8583 channel, and wherein only a first arriving response is processed by the payment network, and a remainder of the two or more arriving responses are discarded by the payment network.

19. The method of claim 5, wherein a single pod in a particular group of authorization control pods establish a valid link to the ISO-8583 channel, and wherein a remainder of the pods in the particular group of authorization control pods are configured to remain in standby mode.

20. The non-transitory computer-readable medium of claim 15, wherein the transaction attributes in the transaction information received from the payment network include a pump location identifier, and wherein the operations further comprises analyzing the transaction information to compare the pump location identifier to the location data received from the user device, and wherein an authorization is provided based on a match of the pump location identifier with the location data received from the user device.

* * * * *